(12) United States Patent
Qasymeh et al.

(10) Patent No.: US 11,314,144 B2
(45) Date of Patent: *Apr. 26, 2022

(54) GRAPHENE MULTI-LAYERED STRUCTURE FOR ULTRA-SENSITIVE MICROPHOTONIC DEVICES WITH MICROVOLT INPUTS

(71) Applicant: Abu Dhabi University, Abu Dhabi (AE)

(72) Inventors: Montasir Yousof Abdallah Qasymeh, Abu Dhabi (AE); Hichem El Euch, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 311 days.

This patent is subject to a terminal disclaimer.

(21) Appl. No.: 16/537,617

(22) Filed: Aug. 11, 2019

(65) Prior Publication Data

US 2020/0319525 A1 Oct. 8, 2020

Related U.S. Application Data

(63) Continuation-in-part of application No. 16/373,605, filed on Apr. 2, 2019, now Pat. No. 10,824,048.

(51) Int. Cl.
*G02F 1/35* (2006.01)
*C01B 32/182* (2017.01)

(52) U.S. Cl.
CPC .......... *G02F 1/353* (2013.01); *C01B 32/182* (2017.08); *C01B 2204/02* (2013.01); *C01B 2204/22* (2013.01); *G02F 2203/11* (2013.01)

(58) Field of Classification Search
CPC .......... G02F 1/353; G02F 1/355; G06F 7/388; H01L 29/66015; Y10S 977/734
See application file for complete search history.

(56) References Cited

U.S. PATENT DOCUMENTS

| | | | |
|---|---|---|---|
| 8,554,022 B1 | 10/2013 | Hochberg | |
| 10,097,281 B1 | 10/2018 | Vernik | |
| 10,121,932 B1 | 11/2018 | Torres | |
| 10,651,027 B2 | 5/2020 | Nagata | |
| 10,824,048 B2 * | 11/2020 | Qasymeh | G02F 1/355 |
| 2016/0227639 A1 | 8/2016 | Kaminer | |
| 2017/0294629 A1 | 10/2017 | Kim | |
| 2020/0013991 A1 | 1/2020 | Wang | |

OTHER PUBLICATIONS

Eyob, E. A., and Eleuch, H. Anomalous optical bistability and robust entanglement of mechanical oscillators using two-photon coherence. Journal of Optical Society of America. Apr. 29, 2015. vol. 32, pp. 971-982. Optical Society of America. USA.

(Continued)

*Primary Examiner* — Daniel Petkovsek

(57) ABSTRACT

A electronic method, includes receiving, by a graphene structure, a microwave signal. The microwave signal has a driving voltage level. The electronic method includes generating, by the graphene structure, optical photons based on the microvolts. The electronic method includes outputting, by the graphene structure, the optical photons.

9 Claims, 21 Drawing Sheets

(56) References Cited

OTHER PUBLICATIONS

Fan, L. and Zou, C.L. and Cheng, R. and Guo, X. and Han, X. and Gong, Z. and Wang, S. and Tang, H. X. Superconducting cavity electro-optics: a platform for coherent photon conversion between superconducting and photonic circuits. Science Advances. 2018. vol. 4, issue 4994, pp. 1-5. AAAS. Washington, DC, USA.

Eyob, E. A. Eleuch, H. Strong squeezing and robust entanglement in cavity electromechanics, Physical Review A. 2014. vol. 89, pp. 013841-1 to 013851-8. American Physical Society. USA.

Zhang, Mian and Wang, Cheng and Cheng, Rebecca and Shams-Ansari, Amirhassan and Lonar, Marko. Monolithic ultra-high-Q lithium niobate microring resonator. Optica. Dec. 2017. vol. 4, No. 12, pp. 1536-1537. Optical Society of America. USA.

Pan, K. and Fan, Y. and Leng, T. and Li, J. and Xin, Z. and Zhang, J. and Hao, L. and Gallop, J. and Novoselov, K. S. and Hu, Z. Sustainable production of highly conductive multilayer graphene ink for wireless connectivity and IoT applications. Nature Communications. Dec. 5, 2018. No. 10-1038, pp. 1-10. USA.

Sakoda, K. and Haus, J. W. Chapter 5—Science and Engineering of Photonic Crystals. Progress in Optics. 2010. vol. 54, pp. 271-317. Elsevier. Amsterdam, The Netherlands. Springer Nature. USA.

Chern, R. L. and Han, D. Nonlocal optical properties in periodic lattice of graphene layers. Optics Express. Feb. 21, 2014. vol. 22, pp. 4817-4829. Optical Society of America. USA.

Qasymeh, M. Phase-Matched Coupling and Frequency Conversion of TerahertzWaves in a Nonlinear Graphene Waveguide. Journal of Lightwave Technology. May 1, 2017. vol. 35, No. 9, pp. 1654-1662. IEEE. USA.

Deng, X.H. and Liu, J.T. and Yuan, J.R. and Liao, Q.H. and Liu, N.H. A new transfer matrix method to calculate the optical absorption of graphene at any position in stratied media. Jan. 29, 2015. Europhysics Letter. vol. 109, pp. 27002-1 to 27002-6. IOP Publishing. Bristol, U.K.

Gershon, Kurizki and Bertet, P. and Kubo, K and Milmer M. and Petrosyan, P. and Rabi, P. and Schmiedmayer J. Quantum technologies with hybrid systems. PNAS. Mar. 31, 2015, vol. 112, No. 13, pp. 3866-3873. U.S. National Academy of Sciences, Washington DC, USA.

Schoelkopf, R. J. and Girvin, S. M. Wiring up quantum systems. Nature. Feb. 7, 2008. vol. 451, pp. 664-669. Nature Publishing Group. USA.

Gua, X. and Kokumb, A. F. and Miranowiczb, A. and Luia, Y.X. and Nor F. Microwave photonics with superconducting quantum circuits. Physics Reports. Oct. 19, 2017. vol. 718719, pp. 1-172. Elsevier. USA.

Gambetta, J. M. and Chow, J. M. and Steen, M. Building logical qubits in a superconducting quantum computing system. Quantum Information. Jan. 13, 2017. vol. 3:2, pp. 1-7. Nature. USA.

Brown, K. R. and Wilson, A. C. and Colombe, Y. and Ospelkaus, C. and Meier, A. M. and Knill, E. and Leibried, D. and Wineland, D. J. Single-qubit-gate error below $10^{\wedge}4$ in a trapped ion. Sep. 14, 2011. Physical Review. vol. 84, pp. 030303-1 to 030303-4. American Physical Society. USA.

Qiang, X. and Zhou, X. and Wang, J. and Wilkes, C. M. and Loke, T. and Ogara, S. and King, L. and Marshall and Santagati, R. and Ralph, T. C. and Wang, J. B. and Obrien, J.L. and Thompson, M. G. Thompson and Matthews, J.F. Large-scale silicon quantum photonics implementing arbitrary two-qubit processing. Nature Photonics. 2018. vol. 12, pp. 534-539. Nature Publishing Group. USA.

Sun, Q.C. and Jiang, Y.F. and Mao Y.L. and You, L.X. and Zhang, W. and Zhang, W.J. and . Jiang, X and Chen, T.Y. and Li, H. and Huang, Y.D. and Chen, X.F. and Wang, Z. and Fan, J. and Zhang, Q. and Pan, J.W. Entanglement swapping over 100km optical fiber with independent entangled photon-pair sources. Optica. Oct. 4, 2017. vol. 4 No. 10, pp. 1214-1218. Optical Society of America. USA.

Gurudev Dutt, M. V. and Childress, L. and Jiang, L. and Togan, E. and Maze, J and Jelezko, F. and Zibrov, A. S. and HEMMER, P. R. and Lukin, M. D. Quantum Register Based on Individual Electronic and Nuclear Spin Qubits in Diamond. Science. Jun. 1, 2007. vol. 316, pp. 1312-1316. AAAS. Washington DC, USA.

Pritchard, J. D. and Isaacs, J. A. and Beck, M. A. and Mcdermott, R. and Saman, M. Hybrid atom-photon quantum gate in a superconducting microwave resonator. Physical Review. A. Jan. 16, 2014. vol. 89, pp. 010301-1 to 010301-5. American Physical Society. USA.

Sete, E. A. and Eleuch, H. High-efficiency quantum state transfer and quantum memory using a mechanical oscillator. Mar. 17, 2015. Physical Review A. vol. 91, pp. 032309-1 to 032309-7. American Physical Society. USA.

Sete, E. A. and Eleuch, H. and OOI, H.R. Entanglement between exciton and mechanical modes via dissipation-induced coupling. Sep. 23, 2015. Physical Review A. vol. 92, pp. 033843-1 to 033843-6. American Physical Society. USA.

Petkovsek, D. Non-Final Office Action, U.S. Appl. No. 16/373,605, filed Jun. 16, 2020. pp. 1-13. United States Patent and Trademark Office. USA.

\* cited by examiner

GRAPHENE MULTI-LAYERED STRUCTURE FOR ULTRA-SENSITIVE MICROPHOTONIC DEVICES WITH MICROVOLT INPUTS

BACKGROUND

There are several techniques that couple quantum photonics and quantum microwave systems. This includes atomic interface techniques, opto-mechanical techniques, and electro-optic (EO) techniques. For example, EO techniques provide for wide operation bandwidths which are tunable and scalable. This allows the EO technique to modulate an optical input pump by a driving microwave signal which also generates an upper and lower sideband. The lower sideband creates noise upon the conversion process as the conversion of a pump photon into a lower side band photon may generate a microwave photon. To minimize noise, a single sideband (SSB) scheme is implemented. However, in such EO techniques, large microwave voltages (e.g., millivolts) are required to conduct the microwave-to-optical conversion. While, high Q-factor resonators may be used to enhance the EO techniques, such resonators limit the tenability of the conversion process. Currently, there is no effective technique that uses voltages less than millivolts which also reduces noise to conduct optimal microwave-to-optical conversion.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may provide for conversion of microwave signals to optical photons using a multilayer graphene structure design as a tunable modulator. In embodiments, graphene layers (e.g., in a graphene structure) are electronically connected and pumped by an optical field. In embodiments, a driving microwave signal modulates the optical input pump. In embodiments, upper and lower sidebands are generated. In embodiments, to generate low noise conversion, the lower sideband is suppressed by the multilayer graphene destruction resonance which is a function of the graphene structure design. Accordingly, the quantity of photons generated from a lower quantity of microwave signals is increased. Also, a frequency-tunable operation is also attained over a vast frequency range (e.g., 1 to 60 GHz (gigahertz)) by modifying the optical frequency range.

As such, a more efficient micro-wave-to-optical conversion is described herein. In embodiments, the graphene layers, within a graphene structure, are connected in an interdigital configuration and, electrically, function as a capacitor and, optically, as a periodic medium. In embodiments, a destruction resonance of the medium is fixed by setting it a particular value and the values of the optical pump frequency and the microwave signal are varied. In embodiments, such values results in the lower sideband frequency to be at the destruction resonance value. Thus, for the described methods, structures, and systems, at greater rates of conversion of microwave-to-optical is achieved with (1) low driving voltages (e.g., 1 to 10 microvolts), (2) reasonable optical pumping, and (3) a greater frequency bandwidth.

In embodiments, various analyses are conducted to determine the improved conversion rate when using the multilayer graphene structure as a quantum modulator, This includes: (1) determining the conversion rate based on the microwave frequency for different electron densities, (2) determining the conversion rate based on the microwave driving voltage, (3) determining the conversion rate based on the optical pump amplitude and the multilayer graphene length, and/or (4) determining conversion rate with decaying optical and microwave fields. Thus, an improved conversion rate of the number of converted photons from the microwave input occurs with a graphene structure that has lower microwave driving voltages, a smaller graphene length, wider microwave frequency range, and reasonable pump amplitudes.

Figure 1:
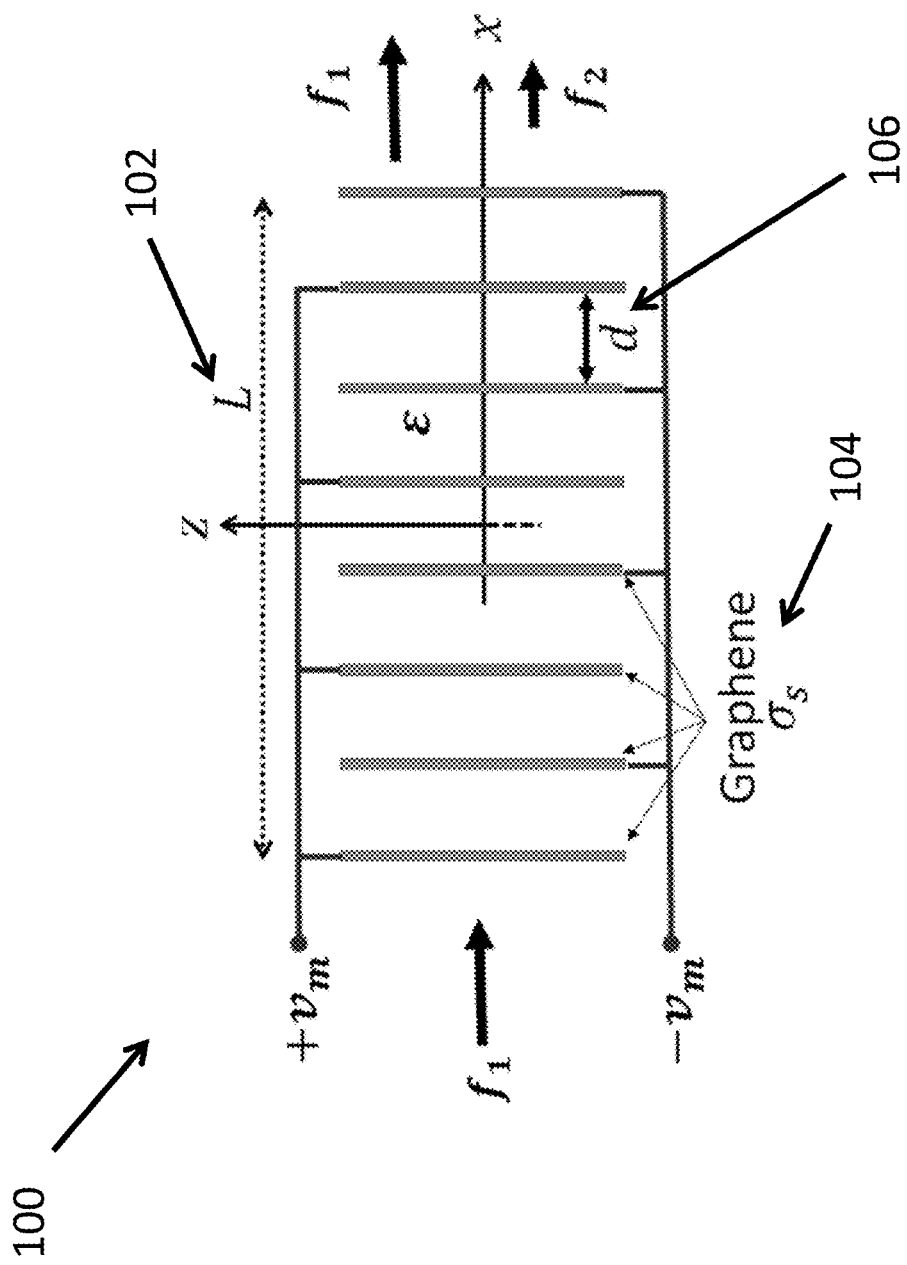
FIG. 1 is a diagram of an example model graphene structural design.

FIG. 1 describes an example design for graphene structure 100. In embodiments, graphene structure 100 is electrically driven by a microwave signal of frequency $f_m$ and subjected to an optical input pump of frequency f1 as shown in FIG. 1. In embodiments, graphene structure 100 is connected in an interdigital configuration and an optical input pump is applied normally to the graphene layers within graphene structure 100 and propagates in the direction of the x axis with a total length 102. In embodiments, each layer 104 within graphene structure 100 is located a distance 106 from each other layer 104.

Figure 2:
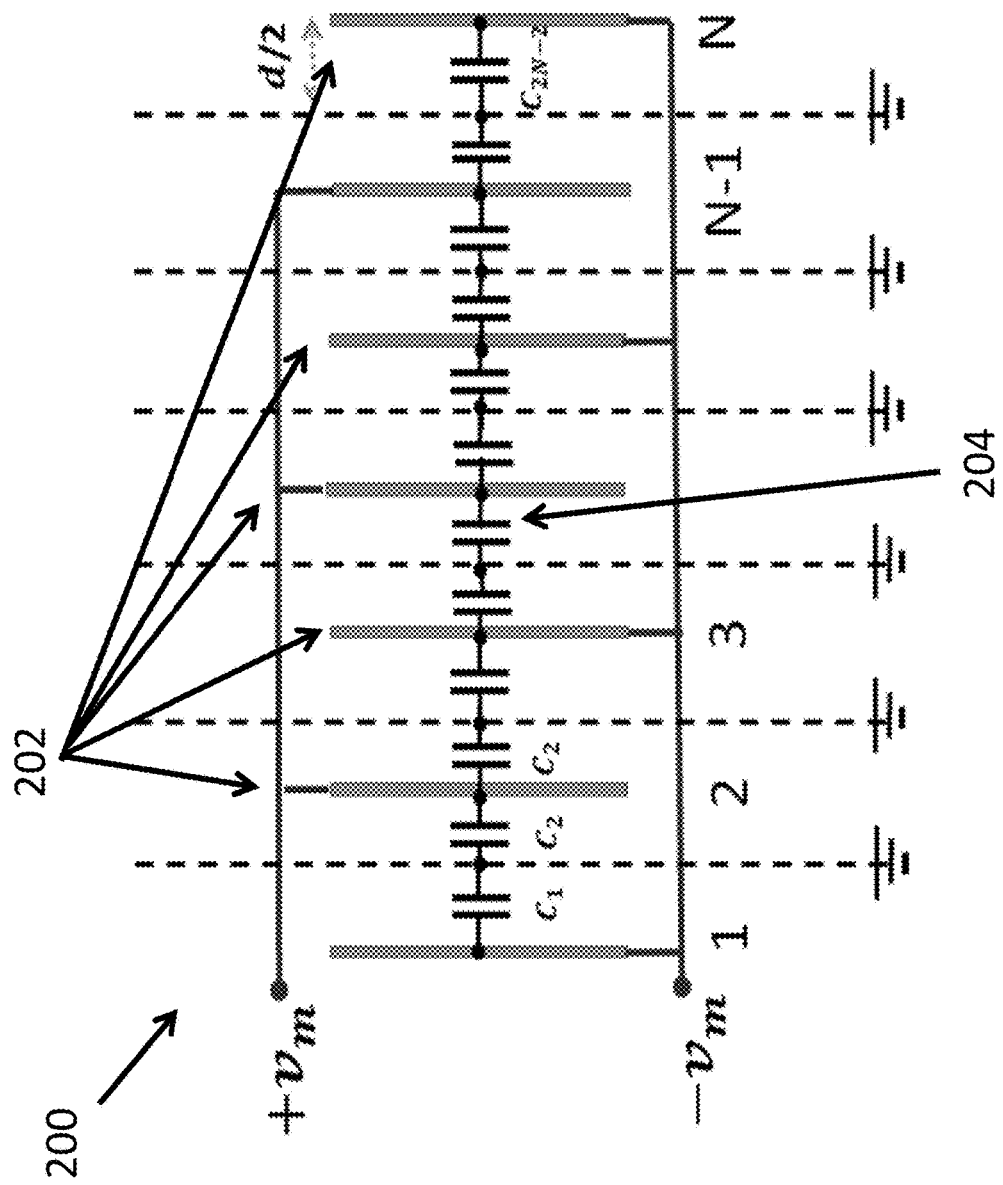
FIG. 2 is a diagram of an example model capacitance design.

FIG. 2 describes an example model capacitance design 200. In embodiments, capacitance design 200 may be associated with graphene structure 100 described in FIG. 1 and model graphene structure 100 as a capacitor. In embodiments, a particular number of identical graphene layers 202 (e.g., "N" number) can be conceived as 2N−2 shunted identical capacitors 204 (each of capacitance C=2ε₀ε/d, as shown in FIG. 2. Here ε is the permittivity of the filling material. In embodiments, the total capacitance (per unit area) is given by CT=(2N−2)C=4(N−1)ε₀/ε. In embodiments, to determined modulated optical conductivity, a multilayer graphene structure (e.g., graphene structure 100) can be modeled by the means of effective permittivity. In embodiments, the graphene conductivity is conducted by both interband and intraband mechanisms, given by equation 1:

$$\sigma_s = \frac{iq^2}{4\pi\hbar}\ln\left(\frac{2\mu_c - (f + i\tau^{-1})\hbar}{2\mu_c + (f + i\tau^{-1})\hbar}\right) + \frac{iq^2 K_B T}{\pi\hbar^2(f + i\tau^{-1})}\left(\frac{\mu_c}{K_B T} + 2\ln\left(e^{-\frac{\mu_c}{K_B T}} + 1\right)\right).$$

In embodiments, equation 1 includes one term that describes the interband conductivity and a second term represents the intraband conductivity. In embodiments, q is the electron charge, n is the plank's constant, τ is the scattering relaxation time, KB represents the Boltzman constant, T is the temperature, f is the frequency, and $\mu_c$ expresses the graphene chemical potential. In embodiments, the operation temperature is considered at the cryogenic level (e.g., 3 mili-Kelvin). In embodiments, the graphene conductivity at a cryogenic-level temperature is dominated by the interband mechanism, while the intraband converge to Drude model. In embodiments, a graphene chemical potential is given by equation 2 as:

$$\mu_c = \hbar V_f \sqrt{\pi n_0 + \frac{2C_T}{q} v_m}, .$$

In embodiments, where $n_0$ is the electron density per unit area, $V_f = 10^6$ m/s, which is the Fermi velocity of the Dirac fermions, and $v_m$ is the driving microwave voltage, defined by equation 3 (where fm is the microwave frequency and c.c. is a complex conjugate):

$$v_m = v e^{-i 2\pi f_m t} + c.c.$$

In embodiments, the microwave voltage in equation 3 is substituted in equation 2. Furthermore, using the approximation $(1+\chi)^{1/2} = 1+\chi$ for $\chi \ll 1$, the chemical potential for $2CTv \ll \pi n0q$, can be determined in equation 4 as:

$$\mu_c = \mu_c' + v\mu_c'' e^{-i 2\pi f_m t} + c.c.,$$

where $$\mu_c' = \hbar V_f \sqrt{\pi n_0}, \text{ and } \mu_c'' = \hbar V_f \frac{C_T}{q\sqrt{\pi n_0}}.$$

In embodiments, substituting the chemical potential in equation 4 into the conductivity portion of equation 1 substituting the chemical potential in equation 4 into the conductivity expression in Eq. (1), and for $v\mu_c'' \ll \mu_c'$, the graphene's conductivity can be approximated up to the first order as equation 6:

$$\sigma_s = \sigma_s' + v\sigma_s'' e^{-i 2\pi f_m t} + c.c.$$

with equations 7 and 8 are:

$$\sigma_s' = \frac{iq^2}{4\pi\hbar} \ln\left(\frac{2\mu_c' - (f + i\tau^{-1})\hbar}{2\mu_c' + (f + i\tau^{-1})\hbar}\right) + \frac{iq^2 K_B T}{\pi\hbar^2 (f + i\tau^{-1})} \left(\frac{\mu_c'}{K_B T} + 2\ln\left(e^{-\frac{\mu_c'}{K_B T}} + 1\right)\right)$$

$$\sigma_s'' = \frac{iq^2}{\pi\hbar} \frac{(f + i\tau^{-1})\hbar}{4(\mu_c')^2 - (f + i\tau^{-1})^2 \hbar^2} \mu_c'' + \frac{iq^2 K_B T}{\pi\hbar^2 (f + i\tau^{-1})} \tanh\left(\frac{\mu_c'}{2K_B T}\right)\frac{\mu_c''}{K_B T}$$

and $$v\sigma_s'' \ll \sigma_s'.$$

In embodiments, the dispersion relation of a graphene structure (e.g., graphene structure 100) may be given by equation 9 (with β is the propagation constant and $Z_0$ is the free space impedance):

$$\cos(d\beta) = \cos\left(d\sqrt{\varepsilon}\frac{2\pi f}{c}\right) - i\frac{Z_0}{2\sqrt{\varepsilon}}\sin\left(d\sqrt{\varepsilon}\frac{2\pi f}{c}\right)\sigma_s$$

Based on equation 6, the propagation constant can be given in equation 10 as:

$$\beta + \beta' v \beta'' e^{-i 2\pi f_m t} + c.c.$$

In embodiments, the propagation constant from equation 10 is substituted in the dispersion relation in equation 9 and expand nonlinear terms. In embodiments, β' may satisfy the dispersion relation in equation 9 with $\sigma_s'$ in lieu of $\sigma_s$. In embodiments, β" may be given by equation 11:

$$\beta'' = i\frac{Z_0}{2d\sqrt{\varepsilon}} \frac{\sin\left(d\frac{2\pi f \sqrt{\varepsilon}}{c}\right)}{\sin(d\beta')} \sigma_s''.$$

Thus, based on equation 11, the effective permittivity of the graphene structure is given by equation 12:

$$\varepsilon_{eff_j} = \varepsilon_{eff_j}' + v\varepsilon_{eff_j}'' e^{-i 2\pi f_m t} + c.c.$$

and where equation 13 is:

$$\varepsilon_{eff_j}' = \left(\frac{\beta_j'}{k_{0_j}}\right)^2, \text{ and } \varepsilon_{eff_j}'' = 2\frac{\beta_j' \beta_j''}{k_{0_j}^2}$$

In embodiments, as shown in equation 12, the microwave signal modulates the effective permittivity of the graphene structure. In embodiments, the upper and lower sidebands are generated with frequencies f2=f1+fm and f3=f1−fm, respectively. In embodiments, the destruction resonance of the multilayer graphene occurs at f3 so that the lower side band is suppressed to the maximum level. Thus, the spontaneous process is minimized. In embodiments, the group velocity at the destruction resonance frequency is set at zero, similar to the reflection resonance for externally incident optical waves. However, in the current scenario there are no reflected waves as the lower side band is generated within the graphene layers and the layered medium is reciprocal. As such, the lower sideband is suppressed by setting $d = c/(f_3(\varepsilon)^{1/2})$. In embodiments, a medium transmittance may be determined to quantify the suppression of the lower sideband. Thus, optical fields in the graphene structure are given by equation 14 (with $u_j$ is the slow varying amplitude and $j \in \{1, 2\}$ as:

$$\vec{E}_j = u_j (e^{-i 2\pi f_j t + i\beta_j' x} + c.c.)\hat{e}y.$$

In embodiments, a classical Hamiltonian for equation 15:

$$\mathcal{H} = \frac{1}{2} \int_V \left(\varepsilon_0 \varepsilon_{eff} |\vec{E}_t|^2 + \mu_0 |\vec{H}_t|^2\right) \partial V.$$

In embodiments, $E_t$ is the total electric field, $H_t$ represents the total magnetic field, and V is the volume. In embodiments, the Hamiltonian in equation 15 describes the total electromagnetic energy of the system. In embodiments, the first part represents the total electric field taking into account the effective permittivity, as described in equation 12. In embodiments, the second part of equation 15 takes into account the magnetic energy, while the system of the graphene structure has zero magnetic susceptibility. In embodiments, the effective permittivity is approximated by implementing a perturbation approach considering a weak driving microwave voltage (e.g., ranging from 1 to 10 microvolts). Accordingly, the chemical potential (represented by its expansion) can be approximated up to the first order. This is validated by imposing the condition 2CT v$\pi$n0q. Consequently, the graphene conductivity, and the effective permittivity can be approximated up to the first order. This approach is verified when numerical calculations are carried out. In embodiments, substituting the expressions of the propagating fields in equation 14 into the Hamiltonian expression in equation 15, and using the effective permittivity in equation 12, the Hamiltonian expression can be rewritten as 2CTv<<$\pi$n0q.

In embodiments, the graphene conductivity, and the effective permittivity can be approximated up to the first order. In embodiments, substituting the expressions of the propagating fields in equation 14 into the Hamiltonian expression in equation 15, and using the effective permittivity in equation 12, the Hamiltonian expression can be rewritten as equation 16:

$$\mathcal{H} = \mathcal{H}_0 + \mathcal{H}_1,$$

where equation 17 is:

$$\mathcal{H}_0 = \mathcal{V} \sum_{j=1}^{2} \varepsilon'_{eff_j} \varepsilon_0 u_j^* u_j + c.c.$$

And equation 18 is:

$$\mathcal{H}_1 = \mathcal{H} \varepsilon''_{eff2} \varepsilon_0 u^*_1 v^* u_2 + c.c.$$

In embodiments, as shown in equation 18, $H_0$ are the classical free fields Hamiltonian and $H_1$ is the classical interaction Hamiltonian. In embodiments, these expressions are used to describe the quantum evolution of the interacting fields.

In embodiments, the optical and microwave fields can be quantized through the following relations (equation 19a and equation 19b):

$$u_j = \left(\frac{\hbar f_j}{\varepsilon'_{eff_j} \varepsilon_0 \mathcal{V}}\right)^{\frac{1}{2}} \hat{a}_j, \text{ and } v = \left(\frac{\hbar f_m}{C_T \mathcal{A}}\right)^{\frac{1}{2}} \hat{b}$$

In embodiments, where $\hat{a}_j$ and $\hat{b}$ are the annihilation operators of the jth optical mode and the microwave mode, respectively. In embodiments, the quantum Hamiltonian can be obtained by substituting the annihilation (and creation) operators, defined above, into the classical Hamiltonian in equation 16, yielding equation 20:

$$\hat{\mathcal{H}} = \hat{\mathcal{H}}_0 + \hat{\mathcal{H}}_1.$$

where equation 21 is:

$$\hat{\mathcal{H}}_0 = \hbar f_m \hat{b}^\dagger \hat{b} + \hbar f_1 \hat{a}_1^\dagger \hat{a}_1 + \hbar f_2 \hat{a}_2^\dagger \hat{a}_2,$$

and equation 22 is:

$$\hat{H}_1 = \hbar g (\hat{a}_2^\dagger \hat{b} \hat{a}_1 + h.c.)$$

In embodiments, where h.c. is the Hermitian conjugate and g is the conversion rate given by equation 23:

$$g = \varepsilon''_{eff2} \sqrt{\frac{f_1 f_2}{\varepsilon'_{eff_1} \varepsilon'_{eff_2}}} \sqrt{\frac{\hbar f_m}{C_T \mathcal{A}}}$$

In embodiments, substituting quantum Hamiltonian expression of equation 20 into Heisenberg equations of motions that yield equations 24, 25, and 26:

$$\frac{\partial \hat{a}_1}{\partial t} = -if_1 \hat{a}_1 - ig \hat{b}^\dagger \hat{a}_2$$

$$\frac{\partial \hat{a}_2}{\partial t} = -if_2 \hat{a}_2 - ig \hat{b} \hat{a}_1$$

$$\frac{\partial \hat{b}}{\partial t} = -if_m \hat{b} - ig \hat{a}_1^\dagger \hat{a}_2$$

In embodiments, In this work, the optical pump input $\hat{a}_1$ is considered intensive and treated classically. In embodiments, on using the rotation approximation:

$$(\hat{a}_j = \hat{A}_j e^{-i\omega_j t} \text{ and } \hat{b} = \hat{B} e^{-i\omega_M t}).$$

the equations of motion are given by equations 27 and 28 as:

$$\frac{\partial \hat{A}_2}{\partial t} = ig A_1 \hat{B}$$

$$\frac{\partial \hat{B}}{\partial t} = ig A_1^* \hat{A}_2$$

In embodiments, the solutions of equations 27 and 28 are given by equation 29:

$$\hat{A}_2(t) = \hat{A}_2(0) \cos(g|A_1|t) - ie^{-i\phi_0} \hat{B}(0) \sin(g|A_1|t).$$

In embodiments, $\varphi_0$ is the phase of the optical input A1. In embodiments, using, equation 29, if the interaction time satisfies equation 30:

$$g|A_1|t = \frac{\pi}{2}$$

Where the upper sideband is
$\hat{A}_2$.
And the microwave signal is
$\hat{B}$
Such that the quantum state of the optical upper sided band depends only on the state of the microwave signal, thus achieving a quantum microwave-to-optical conversion.

Figure 3:
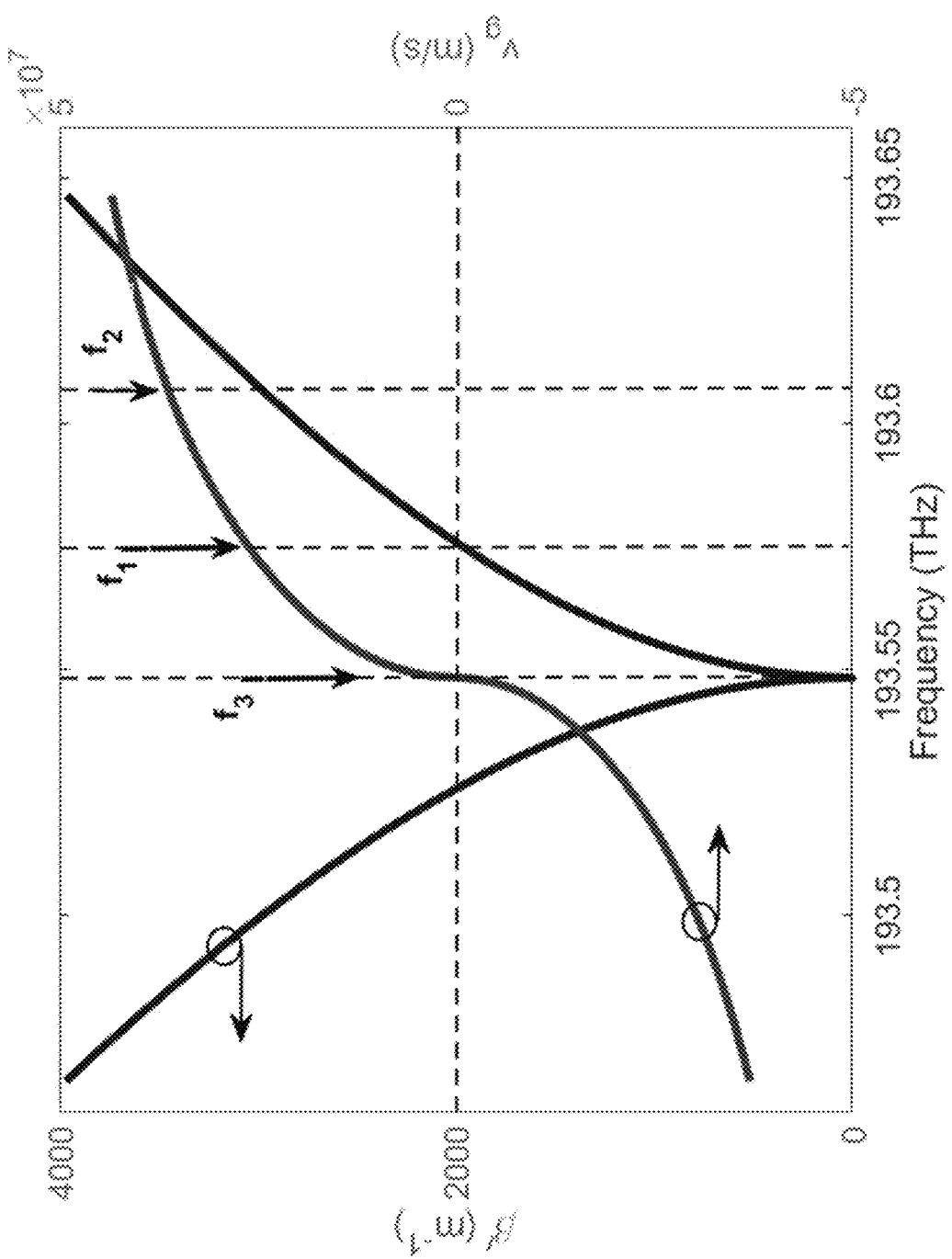
FIGS. 3 and 4 are example electronically generated graphs.
Figure 4:
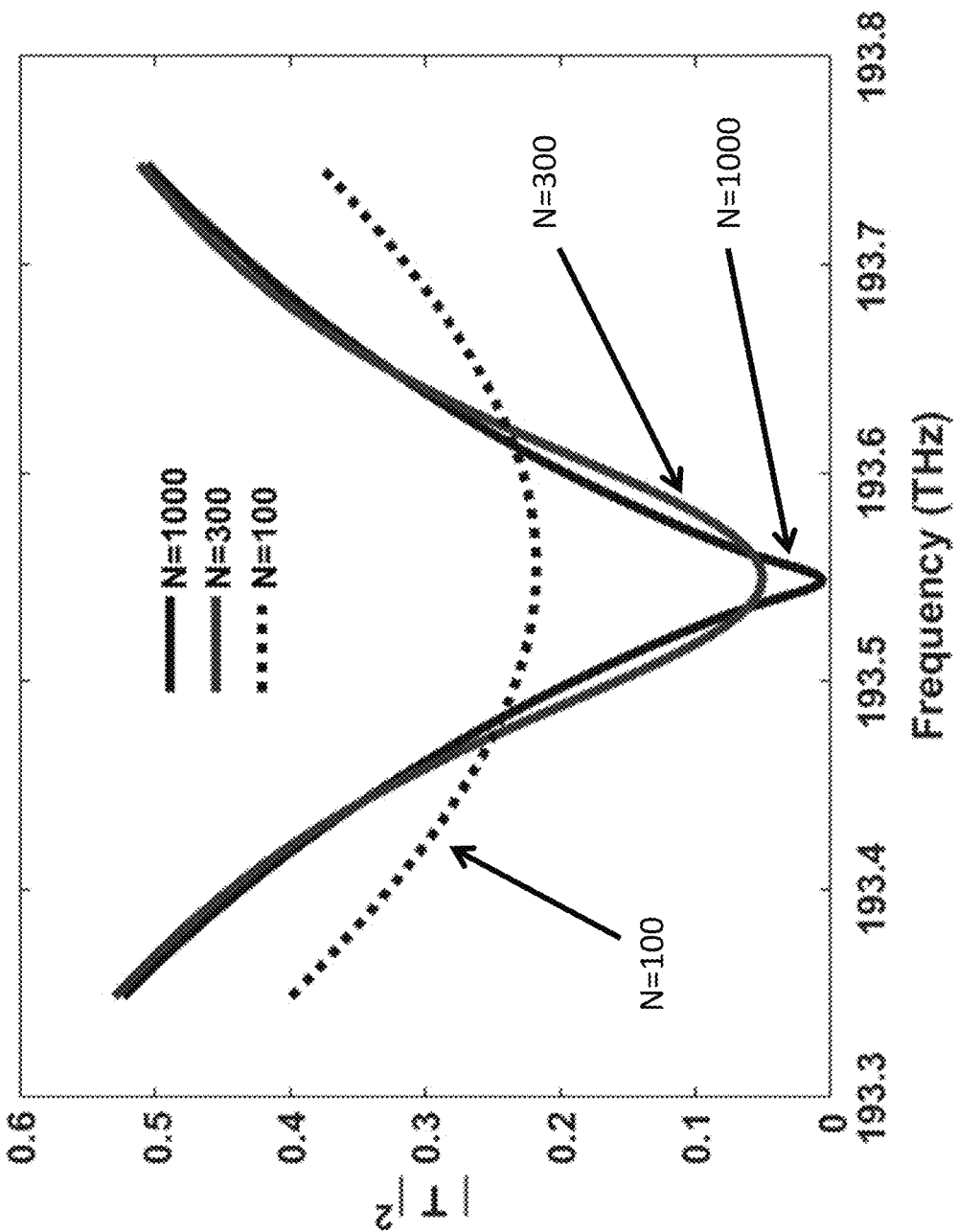

FIGS. 3 and 4 show example electronic graphs of numerical analysis associated with equations 1 to 30. In embodiments, air is filling material, the optical lower sideband frequency is fixed at $f_3$=193.5484 THz, and the separation distance between graphene layers is given by d=1.55 µm. In embodiments, the frequency of the optical pump $f_1$ (which is between $f_2$ and $f_3$) and the microwave signal frequency fm are varied accordingly. In embodiments, the area of the graphene layers is 1 mm$^2$.

In embodiments, the propagation constant (and the group velocity) are calculated for the graphene structure. In embodiments, the transmittance T of the medium is simulated (e.g., using the transfer matrix method) to quantify the suppression of the lower sideband and an extraction ratio is calculated. As shown in FIG. 3, the propagation constant and the group velocity (i.e., $v_g$) are shown versus optical frequency. An example of $f_1$, $f_2$, and $f_3$ are shown for $f_m$=50 GHz. Here, $V_g$ is defined by:

$$v_g = \frac{\partial f}{\partial \beta}.$$

As shown in FIG. 4, the transmittance is displayed versus the optical frequency, considering different numbers of graphene layers. The extraction ratio between the upper and lower side bands can be defined as:

$$\eta_E = \frac{T^2(N)|_{f=f_3}}{T^2(N)|_{f=f_2}}$$

As further shown in FIG. 4, the number of layers is needed to reach a reasonable extraction ratio is shown. For example, for fm=50 GHz, the extraction ratio equals $\eta E=1.1$ for N=100, $\eta E=3$ for N=300, and $\eta E=32$ for N=1000.

Figure 5:
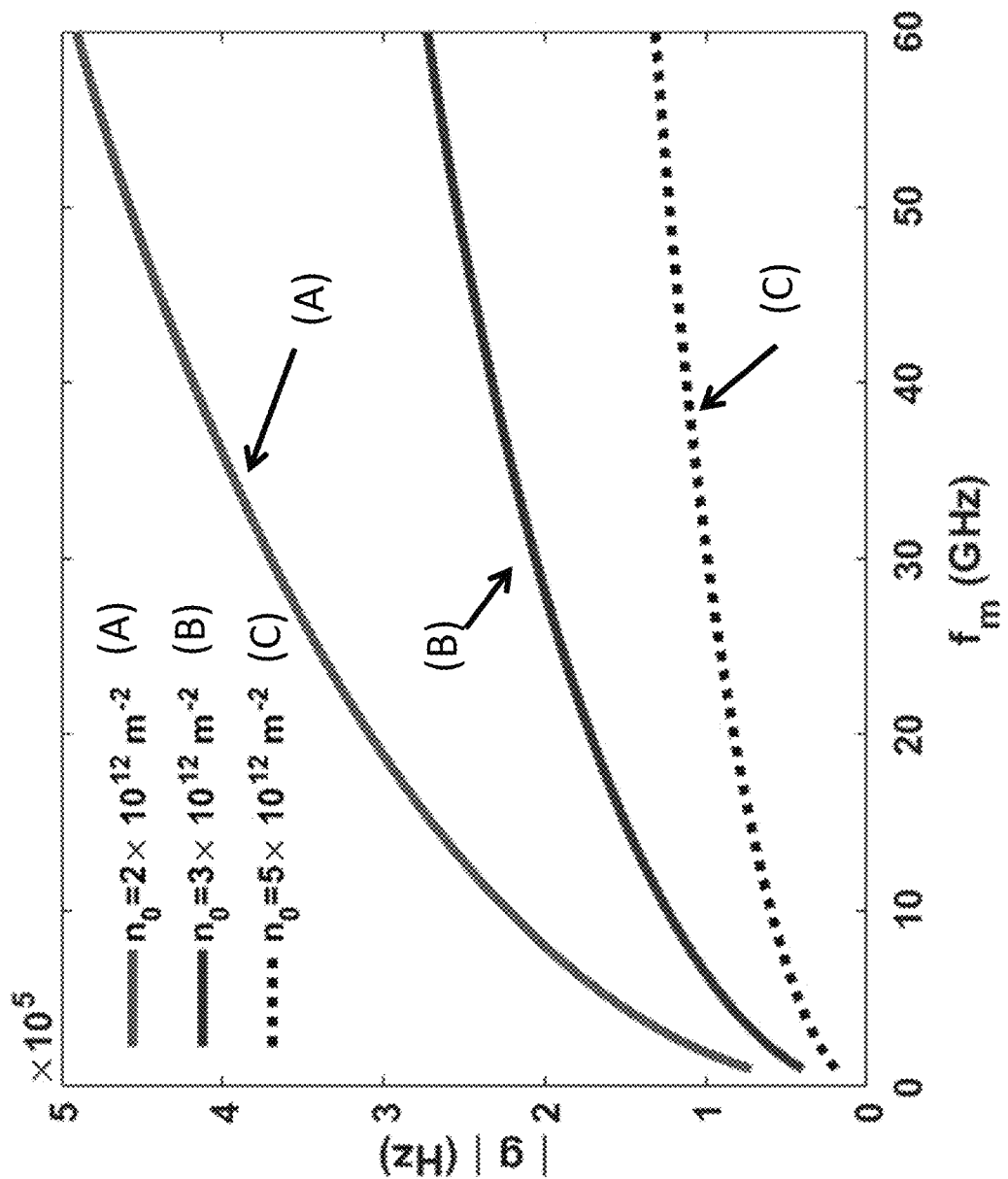
FIGS. 5 and 6 are example electronically generated graphs.

In embodiments, the conversion rate is characterized using different parameters including the drive microwave voltage, the microwave frequency, the electron densities, and the medium length. As shown in FIG. 5, the conversion rate g is evaluated versus the microwave frequency. Here, N=1000, $v=\mu V$, and different electron densities $n_0$ are considered. Higher conversion rates can be achieved for smaller electron densities. In embodiments, the electron density may satisfy a threshold value given by $2C_T v \ll \pi n_0 q$. As shown in FIG. 5, (A) is $n_0=2\times 10^{12}$ m$^{-2}$, (B) is $n_0=3\times 10^{12}$ m$^{-2}$, and (C) $n_0=5\times 10^{12}$ m$^{-2}$.

Figure 6:
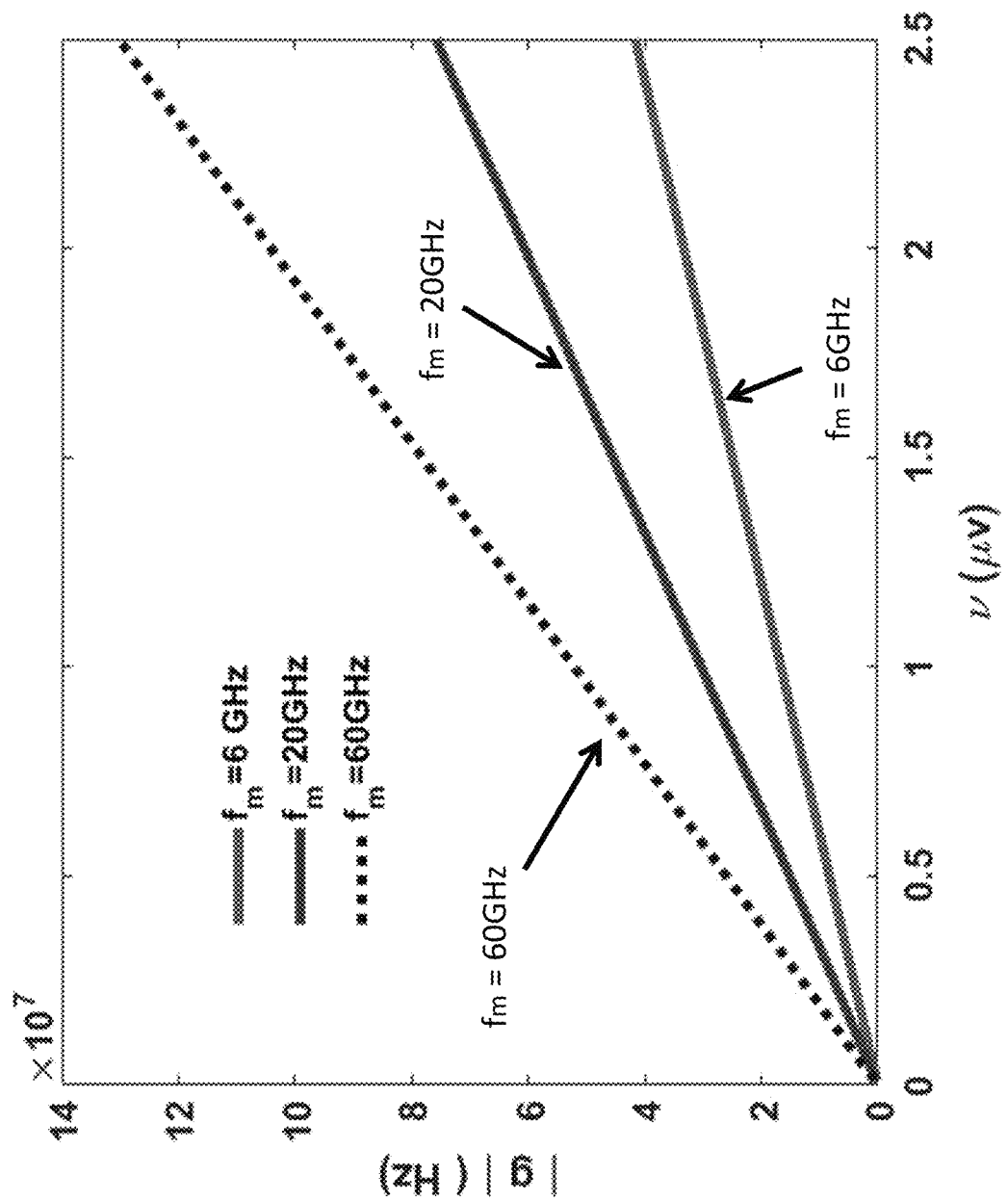

In FIG. 6, the conversion rate is shown versus the driving microwave voltage. Here, N=1000, and $n_0=2\times 10^{12}$ m$^{-2}$. Significant conversion rates can be achieved for microvolt ranges. This is due to the dispersion property of the multilayer graphene and to the significant variation of the graphene conductivity in response to even very small driving electric voltages.

In embodiments, the length of the multilayer graphene medium is given by $L=(N-1)d$. Consequently, by using $t=L 1/v_g$ in equation 30, the required optical pump amplitude is shown by equation 31 as:

$$|A_1| = \frac{\pi v_g}{2L|g|}$$

Figure 7:
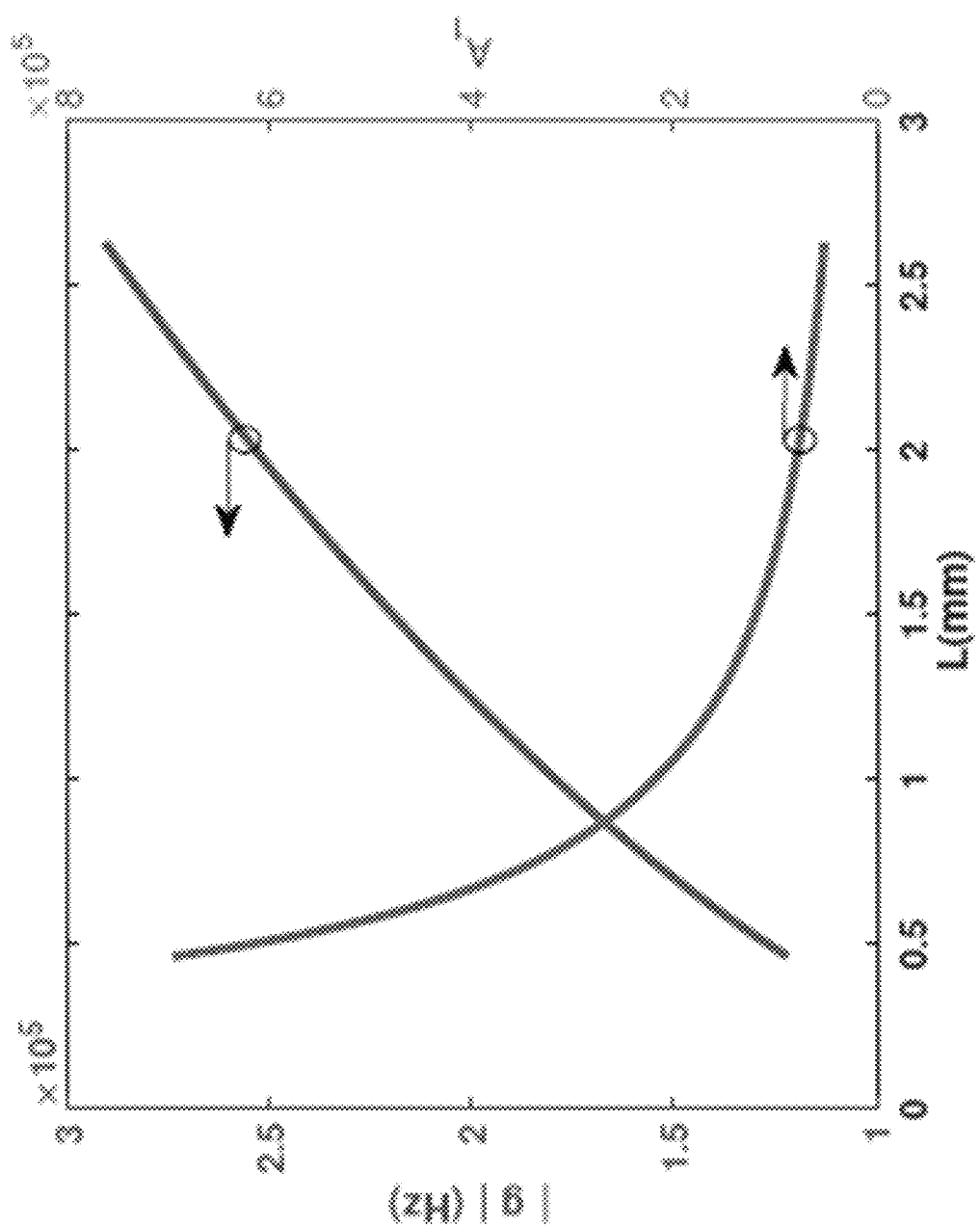
FIG. 7 is an example electronically generated graphs.

In FIG. 7, the conversion rate g is displayed versus the graphene medium length L and the pump amplitude $A_1$. As can be seen, significant conversion rates can be achieved for few propagated millimeters, yet with reasonable pump amplitudes.

In embodiments, equations of motion in equations 27 and 28 describe a closed-quantum system. However, both the optical and the microwave fields decay with time. In embodiments, optical decay is attributed to attenuation and reflection of the multilayer graphene, modeled by including the time decay parameter $\Gamma$ in the equations of motion. The attenuation optical time decay rate is defined by equation 31A:

$$\Gamma_A = 2v_g \text{Im}(\beta).$$

In embodiments, the reflection of the multilayer graphene may be modeled by an equivalent decay coefficient $\Gamma_R$. This decay coefficient (we called it reflection decay coefficient) can be defined by setting $\exp(-t_0\Gamma_R) = T_0^2$. In embodiments, $T_0$ is transmittance of a single block of the multilayer graphene (composed of d filling material and a single graphene layer), and $t_0 = d/v_g$ is the total flight time over a single block.

In embodiments, given that v and b̂ are linearly related as shown in equation 19, modelling the microwave decay rate is conducted. First, the microwave rms power losses is calculated by $v^2/2R_g$ where $Rg = \text{Re}(1/\sigma_s)$ is the graphene resistance for a square layer. Here, the graphene conductivity is calculated at the microwave frequency and T=3 mK. Second, the microwave energy at a time, let us say $t_0$, is approximated as the initial energy at time t=0 minus the rms dissipated energy, that is equation 31B:

$$qv - \frac{v^2}{2R_g} t_0$$

In embodiments, the effective microwave decay rate $\Gamma_m$ is introduced to calculate the microwave energy at the same time $t_0$, yielding equation 31C:

$$qv - \frac{v^2}{2R_g} t_0 = qv e^{-\frac{\Gamma_m}{2} t_0}$$

It then follows (equation 31D):

$$\Gamma_m = -\frac{2}{t_0} \ln\left(1 - \frac{v t_0}{2q R_g}\right)$$

Figure 8:
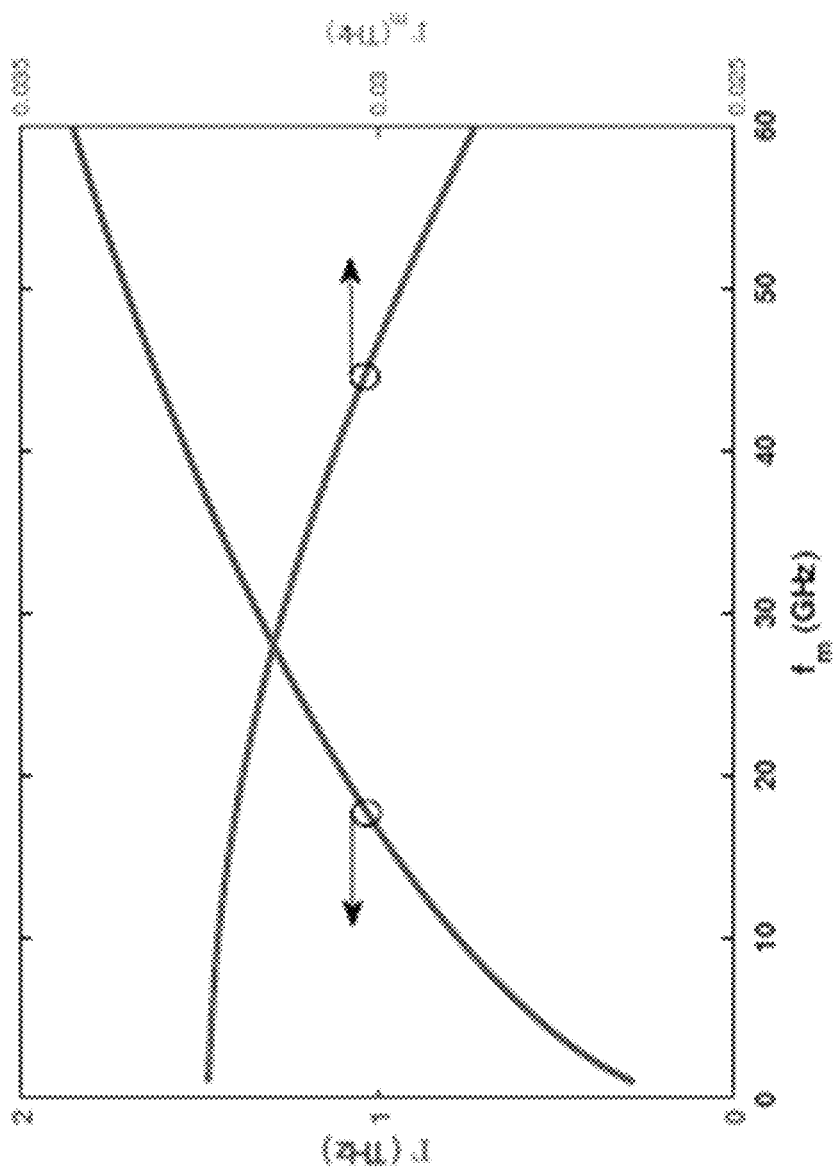
FIGS. 8 and 9 are example electronically generated graphs.

We note here that $\Gamma_m$ depends on the applied voltage amplitude as the electrical dissipation is a nonlinear process. In FIG. 8, the optical and the microwave decay time rates are presented versus the microwave frequency. Here, f3 is fixed at the destruction resonance, and f1 is adjusted in accordance to fm, as f1=f3+fm, $n_0=2\times 10^{12}$m$^{-2}$, and $v=1$ µv. Accordingly, the motions of equations (equations 32 and 33):

$$\frac{\partial \hat{A}_2}{\partial t} = -\frac{\Gamma}{2}\hat{A}_2 - ig A_1 \hat{B} + \sqrt{\Gamma} N_2,$$

$$\frac{\partial \hat{B}}{\partial t} = -\frac{\Gamma_m}{2}\hat{B} - ig A_1^* \hat{A}_2 + \sqrt{\Gamma_m} N_m$$

where $\Gamma = \Gamma_A + \Gamma_R$ is the total optical decay coefficient, $\Gamma_m$ represents the microwave decay coefficient, and $\Gamma_R = v_g/d (\ln/T_0^2)$. Here, N2 and Nm are the quantum Langevin noise operators, obeying (equation 33B):

$$[N(t_1), N(t_2)^\dagger] = \delta(t_1 - t_2) \text{ and}$$

$$\langle N(t_1)^\dagger N(t_2) \rangle = \frac{1}{\exp(\hbar f / k_B T)} \delta(t_1 - t_2)$$

In embodiments, the dissipation characterized by the time decay rates $\Gamma$ and $\Gamma_m$ are included in the equations of motions (equations 32 and 33). Hence, according to the fluctuation-dissipation theorem, the Langevin forces are included. The langevin forces represent the noise in the microwave and optical frequencies as the feed-back of the environment to the system. In embodiments, squeezing between different frequency fields due to a spontaneous process is ignored. In embodiments, the reflected optical pump may be modulated by the microwave signal. In embodiments, as the layered structure is reciprocal, the reflected optical pump may operate the same dynamics as the transmitted optical pump and modulation of the side bands is neglected. Accordingly, to evaluate the number of converted photons, one may write the evolution equations for the mean optical (equation 34) and microwave (equation 35) fields:

$$\frac{\partial \langle \hat{A}_2 \rangle}{\partial t} = -\frac{\Gamma}{2} \langle \hat{A}_2 \rangle - ig A_1 \langle \hat{B} \rangle,$$

$$\frac{\partial \langle \hat{B} \rangle}{\partial t} = -\frac{\Gamma_m}{2} \langle \hat{B} \rangle - ig A_1^* \langle \hat{A}_2 \rangle$$

In embodiments, using equation 31, a complete set of differential equations describe the numbers of photon evolution. In addition, Heaviside step pump switching function H(t), the system of the differential equations can be solved and the solutions are:

$$\langle \hat{A}_2^\dagger \hat{A}_2 \rangle \quad \text{(solution x)}$$

$$\langle \hat{B}^\dagger \hat{B} \rangle \quad \text{(solution y)}$$

In embodiments, solution x may contain terms that correlate with the microwave state and others that decorrelated with microwave state. In embodiments, the signal to noise ratio (SNR) is defined as the ratio of the terms correlate with microwave state to those that decorrelated with microwave state. On imposing the condition of $$A = \left(\frac{\Gamma - \Gamma_m}{4g}\right),$$

the parameter α approaches zero which implies a large SNR. Thus, the decorrelate terms can be ignored. Accordingly, the solution x can be given as equation 36:

$$\langle \hat{A}_2^\dagger \hat{A}_2 \rangle = Agt e^{-\frac{t(\Gamma + \Gamma_m)}{4}} \langle \hat{A}_2^\dagger \hat{B} \rangle \bigg|_{t=0}$$

Where $t=L/v_g$ is the interaction. In embodiments, the optical and microwave fields can be considered decorrelated at $t=0$ and equation 37 is:

$$\langle \hat{B}^\dagger \hat{A}_2 \rangle |_{t=0} = \langle \hat{B}^\dagger \rangle |_{t=0} \langle \hat{A}_2 \rangle |_{t=0} \simeq$$
$$\sqrt{\langle \hat{A}_2^\dagger \hat{A}_2 \rangle |_{t=0} \langle \hat{B}^\dagger \hat{B} \rangle |_{t=0}}$$

In embodiments, the SNR becomes in equation 38:

$$SNR = \frac{\langle \hat{B} \rangle |_{t=0}}{\langle \hat{A}_2 \rangle |_{t=0}}$$

As shown in equation 38, the SNR is large, given that the numerator is the initial microwave expectation value of the annihilation operator, while the denominator is initially at the noise level. For example, a microwave voltage signal of v=1 μV, the SNR is greater than 30 dB.

Figure 9:
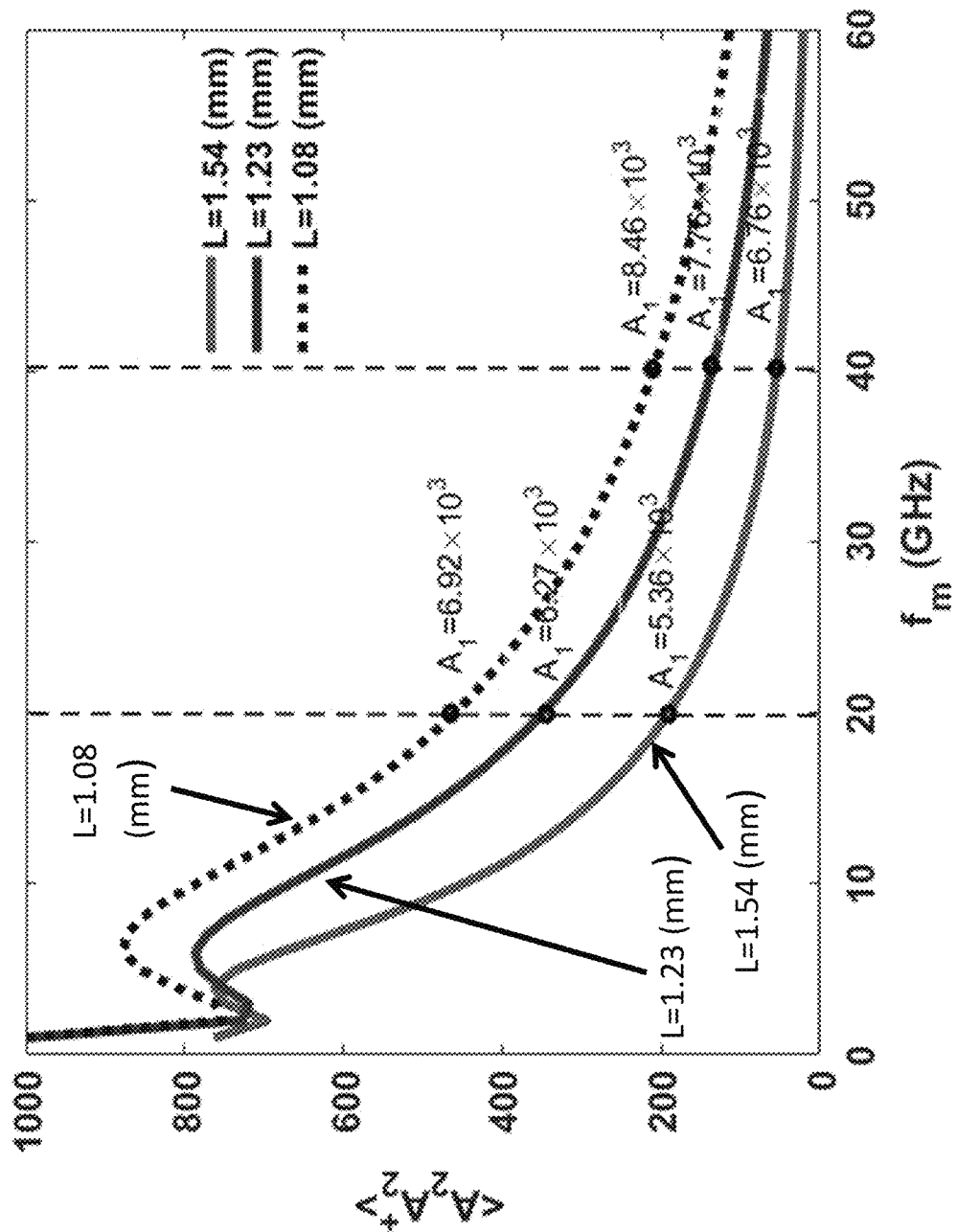

FIG. 9, is an example electronic graph that indicates the number of converted photons versus the frequency of the microwave signal. In embodiments, a significant number of optical photons are converted over a wide microwave frequency range. In embodiments, different lengths of graphene structures (with layers N) are considered. These include L=1.54 mm (i.e., N=1000), L=1.23 mm (i.e., N=800), and L=1.08 (i.e., N=700). In embodiments, a larger number of converted photons may be achieved for shorter lengths of multilayer graphene. However, in this case, larger optical pump amplitudes are required and smaller(extra)ction ratios result. For example, for 1.23 mm and 1.08 mm, respectively. The corresponding pump amplitudes are A1=5.36×10³, 6.27×10³, and 6.92×10³, while the extraction ratios are ηE=31, 20, and 16, respectively. Here, the classical slow varying field amplitude of the optical pump field, i.e., u1, can be calculated from the pump operator, i.e., A1, by equation 19.

In embodiments, as required by the developed model, u1 values are of moderate level. For example, in FIG. 9, A1=6.92×10³ for fm=20 GHz and L=1.08 mm medium length. The corresponding electric optical pump field intensity is u1=71 104 V/m. Thus, the optical pump can be safely treated classically and in the same time its intensity is below the damage threshold of graphene. In embodiments, the peak of the number of converted photons in FIG. 9 is attributed to the transmittance response of the layered media. In embodiments, the optical decay coefficient, Γ, is compressed of the absorption decay coefficient ΓA and the reflection decay coefficient ΓR. Thus, the transmittance (or equivalently the reflection) of the layer medium is dispersive and depends on the frequency of the converted photons (which is f3=f1+fm). This can be verified by comparing the transmittance response, versus fm, with the number of photons in FIG. 9.

Figure 10:
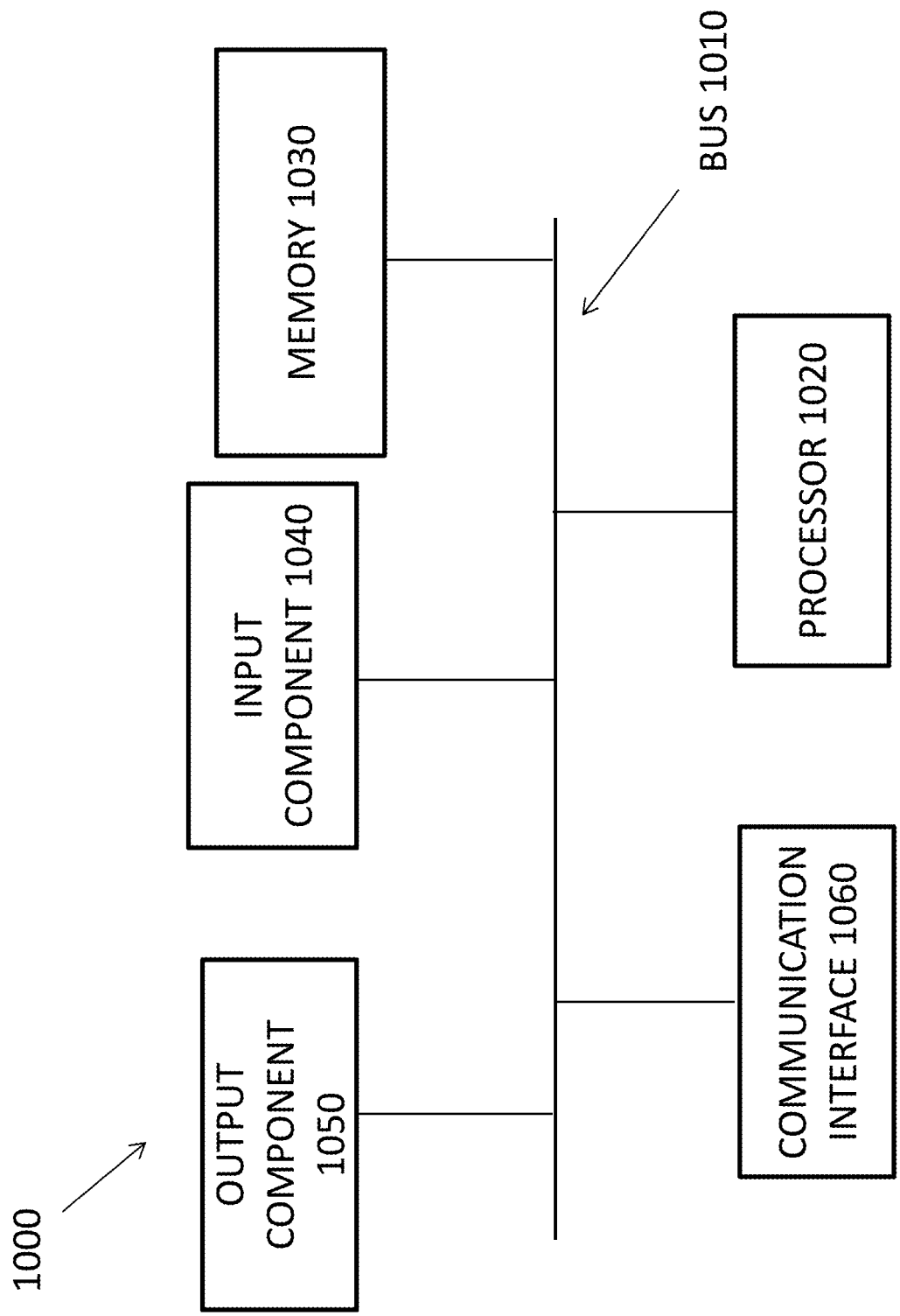
FIG. 10 is an example device.

FIG. 10 is a diagram of example components of a device 1000. Device 1000 may correspond to a computing device, such as devices 1100, 1200, and/or 1202. Alternatively, or additionally, devices 1100, 1200, and/or 1202 may include one or more devices 1000 and/or one or more components of device 1000.

As shown in FIG. 10, device 1000 may include a bus 1010, a processor 1020, a memory 1030, an input component 1040, an output component 1050, and a communications interface 1060. In other implementations, device 1000 may contain fewer components, additional components, different components, or differently arranged components than depicted in FIG. 10. Additionally, or alternatively, one or more components of device 1000 may perform one or more tasks described as being performed by one or more other components of device 1000.

Bus 1010 may include a path that permits communications among the components of device 1000. Processor 1020 may include one or more processors, microprocessors, or processing logic (e.g., a field programmable gate array (FPGA) or an application specific integrated circuit (ASIC)) that interprets and executes instructions. Memory 1030 may include any type of dynamic storage device that stores information and instructions, for execution by processor 1020, and/or any type of non-volatile storage device that stores information for use by processor 1020. Input component 1040 may include a mechanism that permits a user to input information to device 1000, such as a keyboard, a keypad, a button, a switch, voice command, etc. Output component 1050 may include a mechanism that outputs information to the user, such as a display, a speaker, one or more light emitting diodes (LEDs), etc.

Communications interface 1060 may include any transceiver-like mechanism that enables device 1000 to communicate with other devices and/or systems. For example, communications interface 1060 may include an Ethernet interface, an optical interface, a coaxial interface, a wireless interface, or the like.

In another implementation, communications interface 1060 may include, for example, a transmitter that may convert baseband signals from processor 1020 to radio frequency (RF) signals and/or a receiver that may convert RF signals to baseband signals. Alternatively, communications interface 1060 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 1060 may connect to an antenna assembly (not shown in FIG. 10) for transmission and/or reception of the RF signals. The antenna assembly may include one or more antennas to transmit and/or receive RF signals over the air. The antenna assembly may, for example, receive RF signals from communications interface 1060 and transmit the RF signals over the air, and receive RF signals over the air and provide the RF signals to communications interface 1060. In one implementation, for example, communications interface 1060 may communicate with a network (e.g., a wireless network, wired network, Internet, etc.).

As will be described in detail below, device 1000 may perform certain operations. Device 1000 may perform these operations in response to processor 1020 executing software instructions (e.g., computer program(s)) contained in a computer-readable medium, such as memory 1030, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 1030 from another computer-readable medium or from another device. The software instructions contained in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

Figure 11:
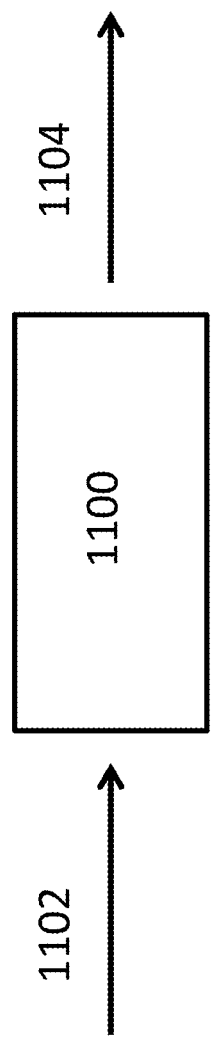
FIG. 11 is an example system.

FIG. 11 is an example diagram. FIG. 11 describes device 1100, communication 1102, and communication 1104. In embodiments, device 1100 may a computing device with features/structures similar to that described in FIG. 10. In embodiments, device 1100 may be a computing device that is part of a laptop, desktop, tablet, smartphone, and/or any other device that may receive communication 1102, analyze communication 1102, and generate output 1104 based on communication 1102. As shown in FIG. 11, communication 1102 may be received by device 1100 (e.g., via keyboard inputs, touchscreen inputs, voice inputs, etc.). In embodiments, communication 1102 may include information about a graphene structure, such as number of layers, thickness, distance between layers, electric features, dielectric features, etc. In embodiments, device 1100 may receive communication 1102 and, based on one or more of equations (1) to (38), as described above, that generate output 1104 that includes information about microwave voltage that may provide for the maximum conversion rate of the microwave fields to optical photons. In alternate embodiments, device 1100 may include a mechanism that receives communication 1102 and generates microwave voltage as part of output 1104.

Figure 12:
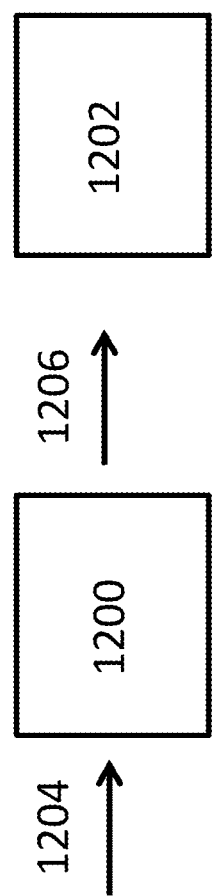
FIG. 12 is an example system.

FIG. 12 is an example diagram. FIG. 12 describes device 1200, device 1202, input 1204, and output 1206. In embodiments, device 1200 may a computing device with features/structures similar to that described in FIG. 12. In embodiments, device 1200 may be a computing device that is part of a laptop, desktop, tablet, smartphone, and/or any other device that may receive communication 1202, analyze communication 1204, and generate output 1206 based on communication 1204. In embodiments, device 1200 may be a computing device that is part of a laptop, desktop, tablet, smartphone, and/or any other device that may receive communication 1204, analyze communication 1204, and generate output 1206 based on communication 1204. In embodiments, device 1202 may be a computing device that is part of a laptop, desktop, tablet, smartphone, and/or any other device that may receive output 1206, analyze output 1206, and generate output 1208 based on output 1206.

In embodiments, communication 1204 may include microwave field information based on one or more of equations (1) to (38) as described above. In embodiments, device 1200 may receive communication 1204 and analyze communication 1204 based on one or more equations (1) to (38). In embodiments, device 1200 may generate output 1206. In embodiments, output 1206 may include electronic design information for a graphene structure. In embodiments, output 1206 may be received by device 1202. In embodiments, device 1202 may generate a physical graphene structure (e.g., graphene structure 100). In embodiments, device 1202 may include wafer fabrication systems. In embodiments, device 1202 may generate a graphene structure or a composite structure that includes a graphene structure.

Figure 13:
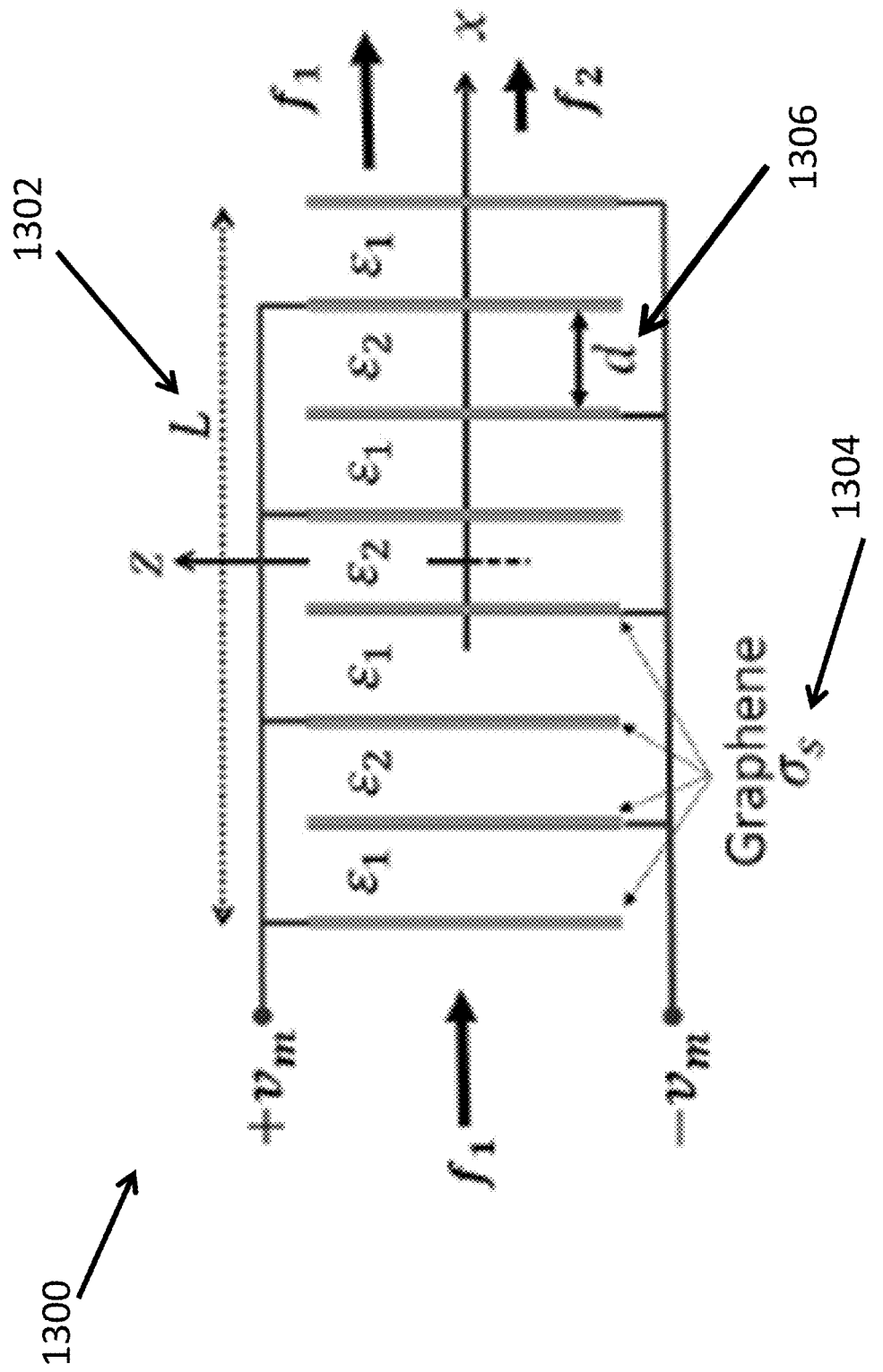
FIG. 13 is a diagram of an example model graphene structural design.

FIG. 13 describes an example design for graphene structure 1300. In embodiments, graphene structure 1300 is electrically driven by a microwave signal of frequency fm and subjected to an optical input pump of frequency f1 as shown in FIG. 13. In embodiments, graphene structure 1300 is connected in an interdigital configuration and an optical input pump is applied normally to the graphene layers within graphene structure 1300 and propagates in the direction of the x axis with a total length 1302. In embodiments, each layer 1304 within graphene structure 100 is located a distance 1306 from each other layer 1304. In embodiments, as shown in FIG. 13, each layer 1304 has two different materials with permittivities ε1 and ε2 which incorporate the destruction resonance of the graphene layers. Accordingly, the required number of layers required to achieve an efficient suppression of the lower sideband is reduced. In embodiments, the permittivity contrast may be small ε1−ε2≪ε1 to result in a narrow transmission band gap of the graphene layers. As such, the transmission of the graphene layers is discriminative between the lower and upper sidebands to prevent both sidebands from being equally suppressed.

In embodiments, graphene structure 1300 may be modeled as 2N–N capacitors as shown in FIG. 2. In embodiments, the total capacitance is given as equation 40:

$$C_T = \begin{cases} NC_1 + (N-2)C_2, & N \text{ is Even.} \\ (N-1)C_1 + (N-1)C_2, & N \text{ is Odd} \end{cases}.$$

And, where $$C_1 = \frac{\varepsilon_0 \varepsilon_1}{\frac{1}{2}d}, \quad C_2 = \frac{\varepsilon_0 \varepsilon_2}{\frac{1}{2}d}$$

In embodiments, ε0 is the free space permittivity and ε1 is the permittivity of a first filling material and ε2 is the permittivity of a second filling material as shown in FIG. 13.

In embodiments, graphene structure 1300 may also be described in terms of finding a dispersion relation which can be obtained from boundary condition. In embodiments, TM optical fields can be shown with the boundary conditions in the following equality in equation (41):

$$\begin{vmatrix} 1+\frac{q_1}{\omega\varepsilon_0\varepsilon_1} & 1-\frac{q_1}{\omega\varepsilon_0\varepsilon_1} & -1 & +1 \\ -1 & +1 & \frac{q_1\varepsilon_1}{q_1\varepsilon_2} & -\frac{q_2\varepsilon_1}{q_1\varepsilon_2} \\ e^{iq_1\frac{d}{2}} & e^{-iq_1\frac{d}{2}} & -e^{i\beta d}e^{-iq_2\frac{d}{2}} & -e^{i\beta d}e^{iq_2\frac{d}{2}} \\ -e^{iq_1\frac{d}{2}} & e^{-iq_1\frac{d}{2}} & \frac{q_2\varepsilon_1}{q_1\varepsilon_2}e^{i\beta d}e^{-iq_1\frac{d}{2}} & -\frac{q_2\varepsilon_1}{q_1\varepsilon_2}e^{i\beta d}e^{iq_1\frac{d}{2}} \end{vmatrix} = 0$$

And, where:

$$q_1 = \frac{\omega\sqrt{\varepsilon_1}}{c}, \quad q_2 = \frac{\omega\sqrt{\varepsilon_2}}{c}$$

In embodiments, β is a propagation constant, σ(s) is a graphene conductivity, and $Z_0$ is an impedance of free space. In embodiments, for a case of small permittivity contrast, such that (ε2−ε1/ε1)<<1, a closed form approximation for the equality in equation 41 is given as:

$$\cos(\beta d) = \cos\left(\frac{\sqrt{\varepsilon_1}+\sqrt{\varepsilon_2}}{2}\frac{2\pi f}{c}d\right) - i\frac{Z_0}{2\sqrt{\varepsilon}}\sin\left(\frac{\sqrt{\varepsilon_1}+\sqrt{\varepsilon_2}}{2}\frac{2\pi f}{c}d\right)\sigma_s$$

In embodiments, an effective permittivity for graphene structure 1300 can be determined by determining a perturbation analysis for the dispersion relation. In embodiments, a microwave signal that is biasing the graphene layers in FIG. 13 may be given as:

$$u_m = v e^{-i2\pi f_m t} = c.c.$$

In embodiments, based on equation (4) as given above, a graphene conductivity may then be given (or approximated) by equation (42):

$$\sigma_s = \sigma_s^{(1)} + v\sigma_s^{(2)} e^{-i2\pi f_m t} + c.c.$$

And, where:

$$\sigma_s^{(1)} = \frac{iq^2}{4\pi\hbar}\ln\left(\frac{2\mu_c^{(1)}-(f+i\tau^{-1})\hbar}{2\mu_c^{(1)}+(f+i\tau^{-1})\hbar}\right) + \frac{iq^2 K_B T}{\pi\hbar^2(f+i\tau^{-1})}\left(\frac{\mu_c^{(1)}}{K_B T}+2\ln\left(e^{-\frac{\mu_c^{(1)}}{K_B T}}+1\right)\right)$$

And, $$\sigma_s^{(2)} = \frac{iq^2}{\pi\hbar}\frac{(f+i\tau^{-1})\hbar}{4(\mu_c^{(1)})^2-(f+i\tau^{-1})^2\hbar^2}\mu_c^{(2)} + \frac{iq^2 K_B T}{\pi\hbar^2(f+i\tau^{-1})}\tanh\left(\frac{\mu_c^{(1)}}{2K_B T}\right)\frac{\mu_c^{(2)}}{K_B T}$$

Accordingly, the propagation constant may be approximated up to the first order. Thus, the effective permittivity of graphene structure 1300 may be given as equation (43):

$$\varepsilon_{\mathit{eff}_j} = \varepsilon_{\mathit{eff}_j}^{(1)} + v\varepsilon_{\mathit{eff}_j}^{(2)} e^{-i2\pi f_m t} + c.c.$$

And, where equation (44) is:

$$\varepsilon_{\mathit{eff}_j}^{(1)} = \left(\frac{\beta_j^{(1)}}{k_{0_j}}\right)^2, \quad \varepsilon_{\mathit{eff}_j}^{(2)} = 2\frac{\beta_j^{(1)}\beta_j^{(2)}}{k_{0_j}^2}, \quad \beta_j^{(1)}$$

In embodiments, equation (44) is a solution of the dispersion relation in equation (42) and $$\left|\beta^{(2)} = i\frac{Z_0}{2d\sqrt{\varepsilon}}\frac{\sin\left(d\frac{2\pi f\sqrt{\varepsilon}}{c}\right)}{\sin(d\beta^{(1)})}\sigma_s^{(2)}\right.$$

In embodiments, the lower sideband may be removed by utilizing destructive resonance of the layered medium. In embodiments, a classical optical pump at frequency f1 may be considered. Accordingly, motion equations of optical and microwave operators may be given as equations (45) and (46), respectively:

$$\frac{\partial \hat{A}_2}{\partial t} = -\frac{\Gamma}{2}\hat{A}_2 - ig A_1 \hat{B} + \sqrt{\Gamma} N_2 \quad (45)$$

$$\frac{\partial \hat{B}}{\partial t} = -\frac{\Gamma_m}{2}\hat{B} - ig A_1^* \hat{A}_2 + \sqrt{\Gamma_m} N_m \quad (46)$$

In embodiments, Γ and $\Gamma_m$ are the optical and microwave decay coefficients, respectively, and N2 and Nm are the noise operators. In embodiments, a total optical decay coefficient $\Gamma = \Gamma_A + \Gamma_T$ may include both an optical attenuation decay coefficient given by $\Gamma_A = 2v_g \text{Im}(\beta)$ and an optical transmittance decay coefficient $\Gamma_T = (v_g/d)\ln(1/T_0)$. In embodiments, $v_g$ is a group velocity and $T_0$ is a transmittance of a single block (e.g., including one graphene layer and one filling material). In embodiments, a microwave decay coefficient may be attributed to ohmic losses of the graphene layers and is given by equation (47):

$$\Gamma_m = -\frac{2}{t_0}\ln\left(1 - \frac{vt_0}{2q}\text{Re}(\sigma_s')\right)$$

In embodiments, to is a travel time over a single block of a layered medium. In embodiments, numerical evaluations may indicate that an optical decay coefficient is larger than the microwave decay coefficient by more than one order (i.e., dominating optical losses). In embodiments, a number of photons may be determined by equations 45 and 46.

In embodiments, determination of up-conversion rate and average number of converted photons may be conducted in the following examples. In embodiments, a frequency of the lower sideband is fixed at f3=193.5484 THz. In other embodiments, other frequencies may be used. In embodiments, a destruction resonance may designated as f3, by controlling d, while the microwave and the optical pump frequencies (fm and f1) may be varied accordingly. In embodiments, an operating temperature is considered as T=3 mK. In other embodiments, other operating temperatures may be used. In embodiments, graphene layer area $A=10^{-4} m^2$ and an intrinsic electron density is $n_o=10^{12} m^{-3}$. In other embodiments, other intrinsic electron densities may be used. In the following examples, a filling material may be described in terms of refractive indices rather than permittivities as refractive indices may be used to classify optical materials. In embodiments $n2=(\varepsilon 2)^{1/2}$ and $n1=(\varepsilon 1)^{1/2}$. Furthermore, the following examples may use a single material, n1=n2 and a determination is made of conversion rate, average number of converted photons, and an extraction ratio that quantifies a suppression of the lower sideband. In another example, two different filling materials may be used with a small refractive index contrast. In embodiments, refractive index n2 is fixed at n2=1.5 while n1 is varied given that $(\varepsilon 2-\varepsilon 1)/\varepsilon 1 \ll 1$. In embodiments, a conversion rate, average number of converted photons and an extraction ratio are determined versus a number of layers N, microwave frequency fm as well as different refractive index contrasts (i.e., n2−n1) are evaluated.

In embodiments, air may be considered as a single filing material, n1=n2=1. In embodiments, an up-conversion rate and the average number of photons to an optical domain are evaluated versus a frequency of a driving microwave signal and a graphene number of layers. Additionally, a lower sideband suppression is evaluated by determining an extraction ratio.

Figure 14:
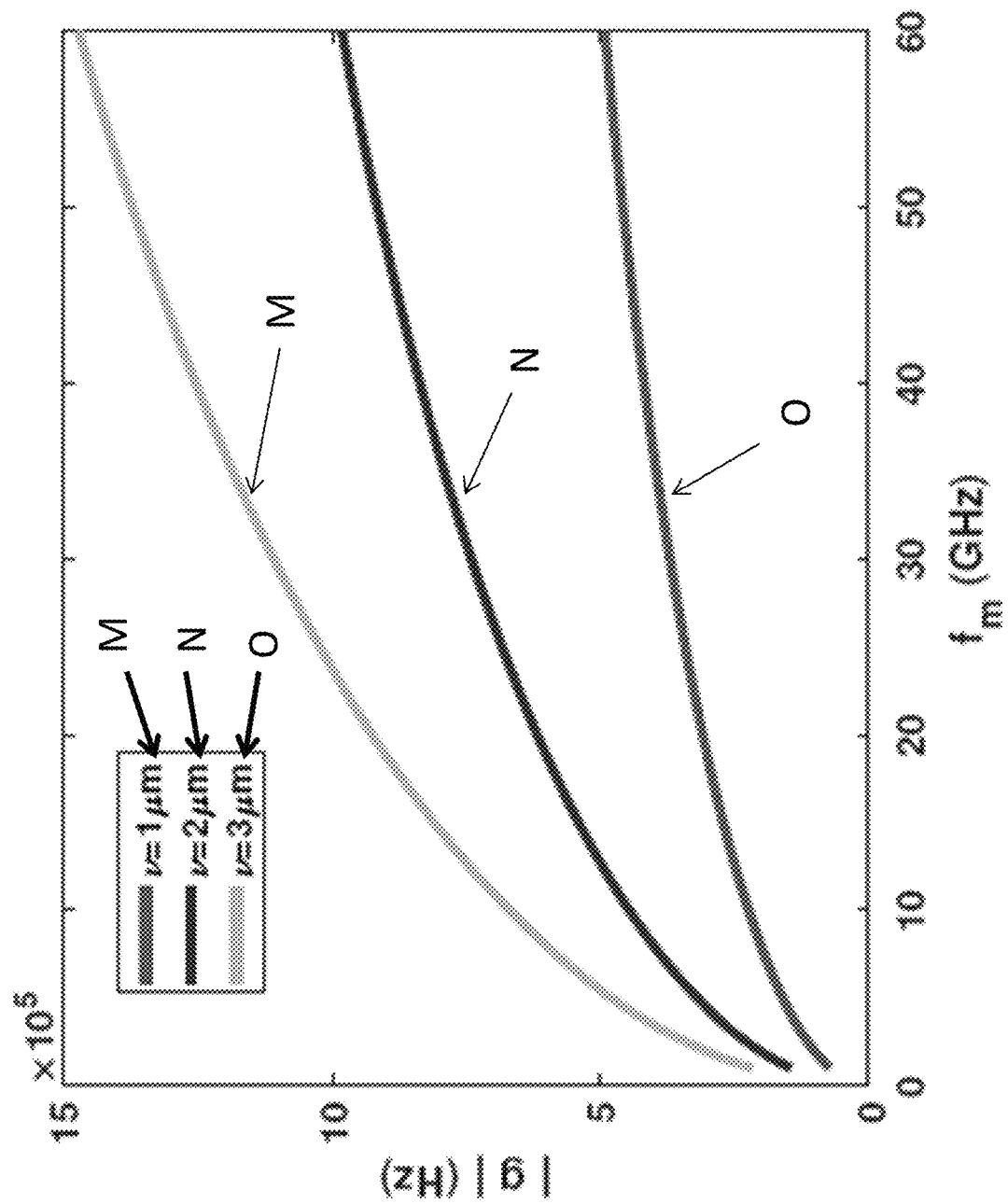
FIGS. 14-21 are example electronically generated graphs.
Figure 15:
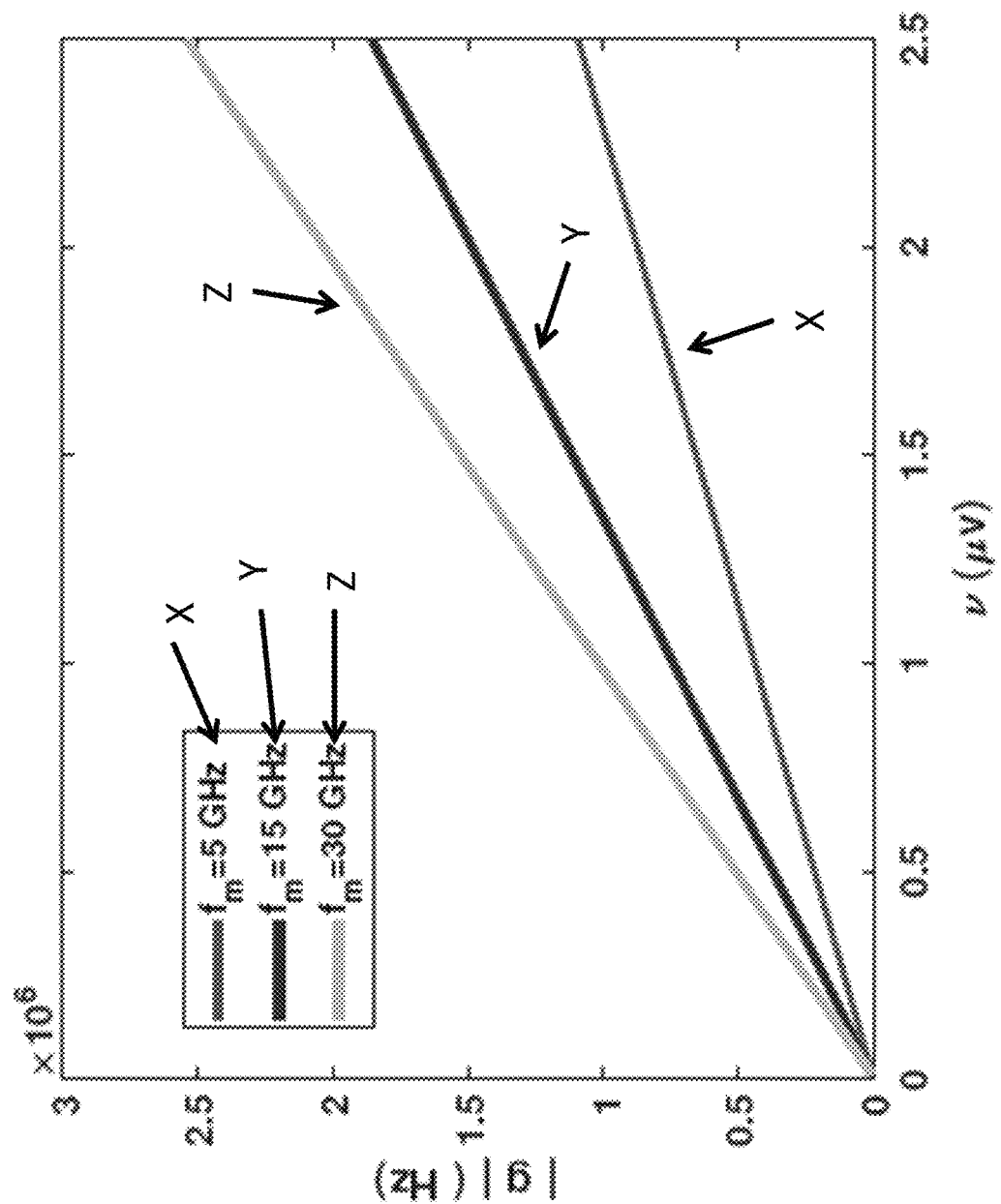

As shown in FIG. 14, an up-conversion rate is calculated against a frequency of a microwave driving signal. In embodiments, different microwave voltages may be considered. As shown in FIG. 14, a significant conversion rate can be achieved over a large microwave frequency range. Furthermore, in FIG. 15, an up-conversion rate is determined against a biasing microwave voltage with several microwave frequencies considered. As shown in FIG. 15, a conversion may be achieved with a low amount of microwave driving voltages which may be due to the dispersion of the layered medium and graphene conductivity.

Figure 16:
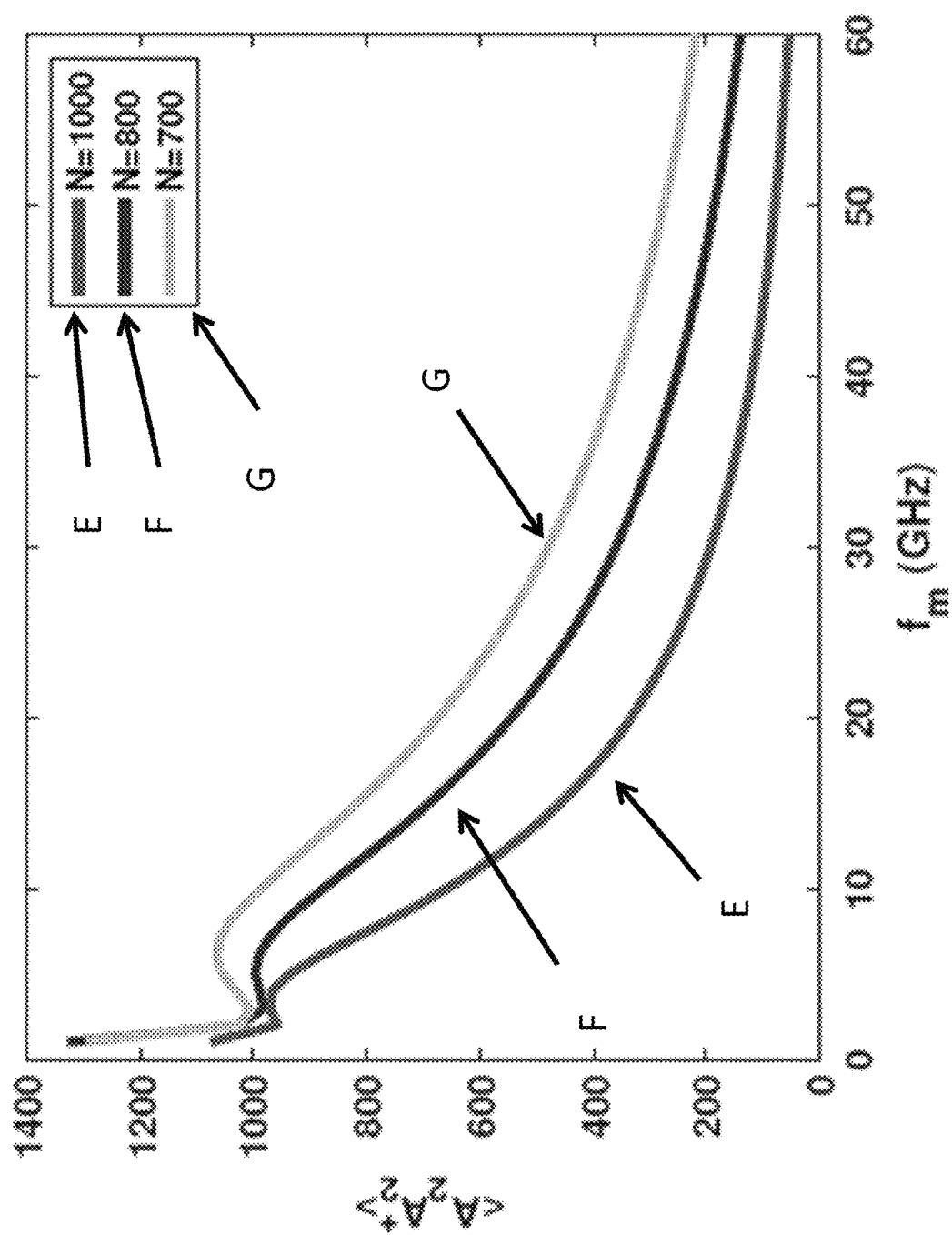

As shown in FIG. 16, an average number of photons converted to an optical frequency domain are shown against a microwave frequency. In embodiments, different layers are considered. As shown in FIG. 16, a large number of converted photons are achieved for a few hundred graphene layers. In embodiments, to determine a lower sideband suppression, a transmittance of a proposed structure using a transfer matrix method. Then, an extraction ratio is determined and defined by equation (48):

$$E_R = \frac{T^2(N, f_3)}{T^2(N, f_2)}$$

Figure 17:
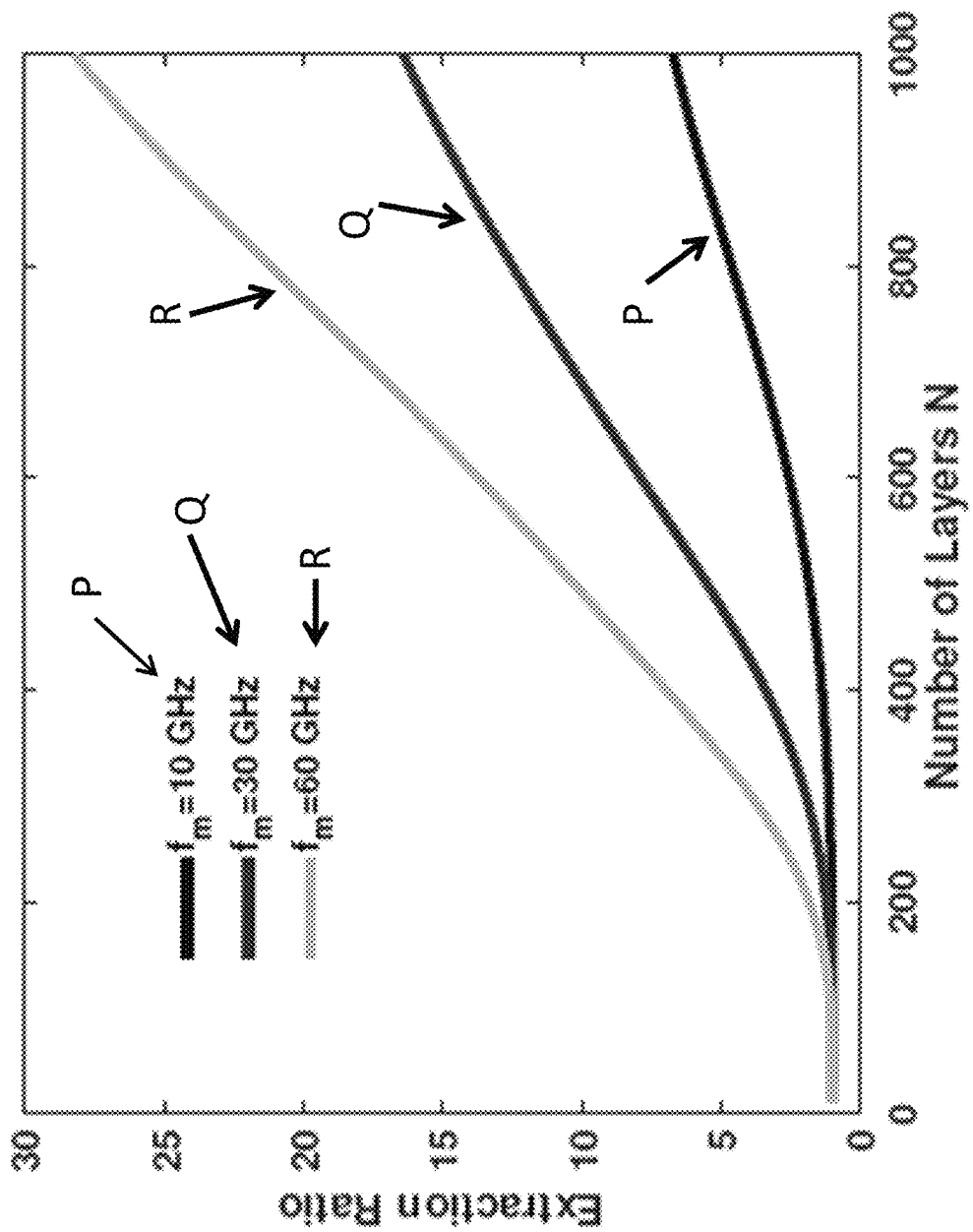

In embodiments, $T(N, f_i)$ is a transmittance of N layers at frequency $f_i$. As shown in FIG. 17, an extraction ratio may be evaluated against a number of graphene layers. As shown in FIG. 16, for example, for fm=30 GHz, one thousand layers may be needed to attain an extraction ratio of ER=16. Accordingly, by incorporating multiple filling materials in the graphene layers, the number of layers may be reduced.

In embodiments, with two different filling materials with a small refractive index contrast. In embodiments, a refractive index contrast is related to a permittivity contrast by $n2-n1 \approx (\varepsilon 2-\varepsilon 1/2\varepsilon 1)$. In embodiments, a same conversion rate is achieved as with a single layer but with a given small contrast. However, a transmittance of graphene layers is significantly modified. Accordingly, a suppression of a lower sideband may be enhanced and a required number of graphene layers may be reduced.

Figure 18:
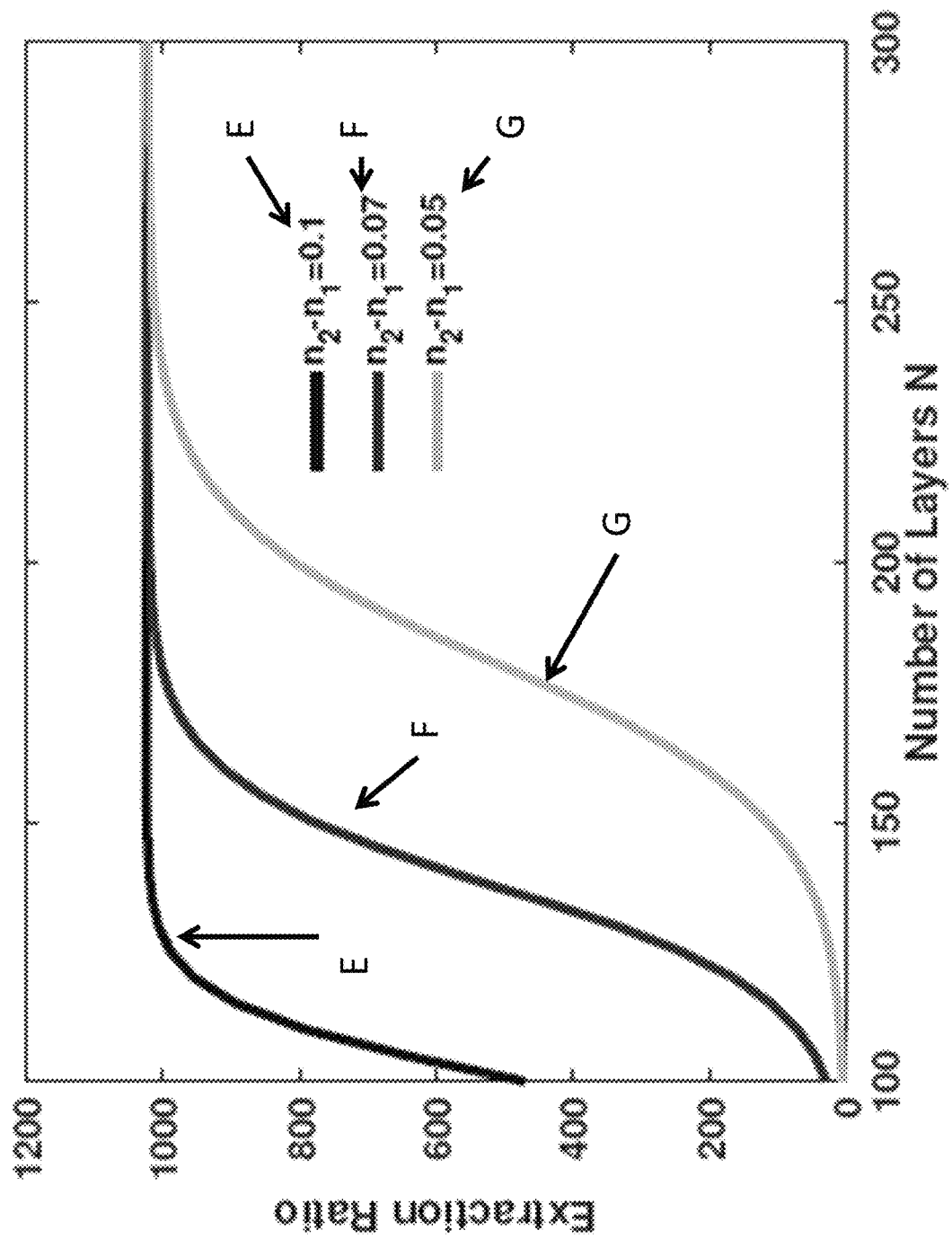

In embodiments, FIG. 18 shows the extraction ratio evaluated versus the number of graphene layers. He microwave frequency is fm=50 GHz and different refractive index contrasts are analyzed. As shown in FIG. 18, the required number of graphene layers to attain a large extraction ratio is reduced. For example, only 150 graphene layers (i.e., N=150) are needed to achieve a large extraction ratio, such as ER=900 for n2−n1=0.07.

Figure 19:
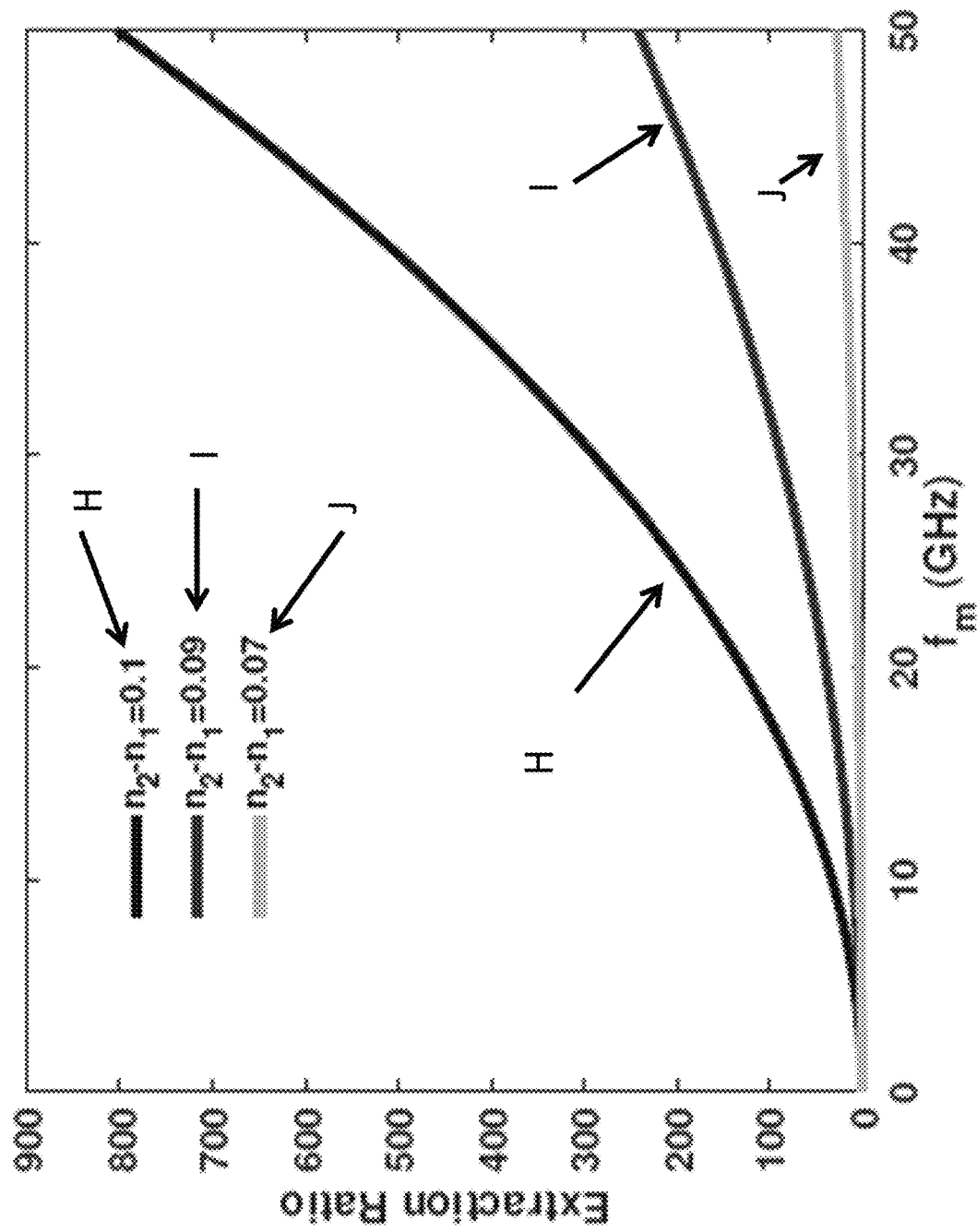

In embodiments, as shown in FIG. 19, the extraction ratio is calculated versus the microwave frequency for N=100 graphene layers. As such, different refractive index contrasts are considered. Thus, a large extraction ratio is achieved by introducing small refractive index contrast. For example, N=1 and fm=30 GHz, an extraction ratio of En=300 can be achieved for n2−n1=0.1 (i.e., $(\varepsilon 1-\varepsilon 2/\varepsilon 1)=0.148$) as long as $\varepsilon 1-\varepsilon 2 \ll \varepsilon 1$ so as to prevent widening of the bandgap of the layers and also prevent both upper and lower sidebands from being strongly attenuated.

Figure 20:
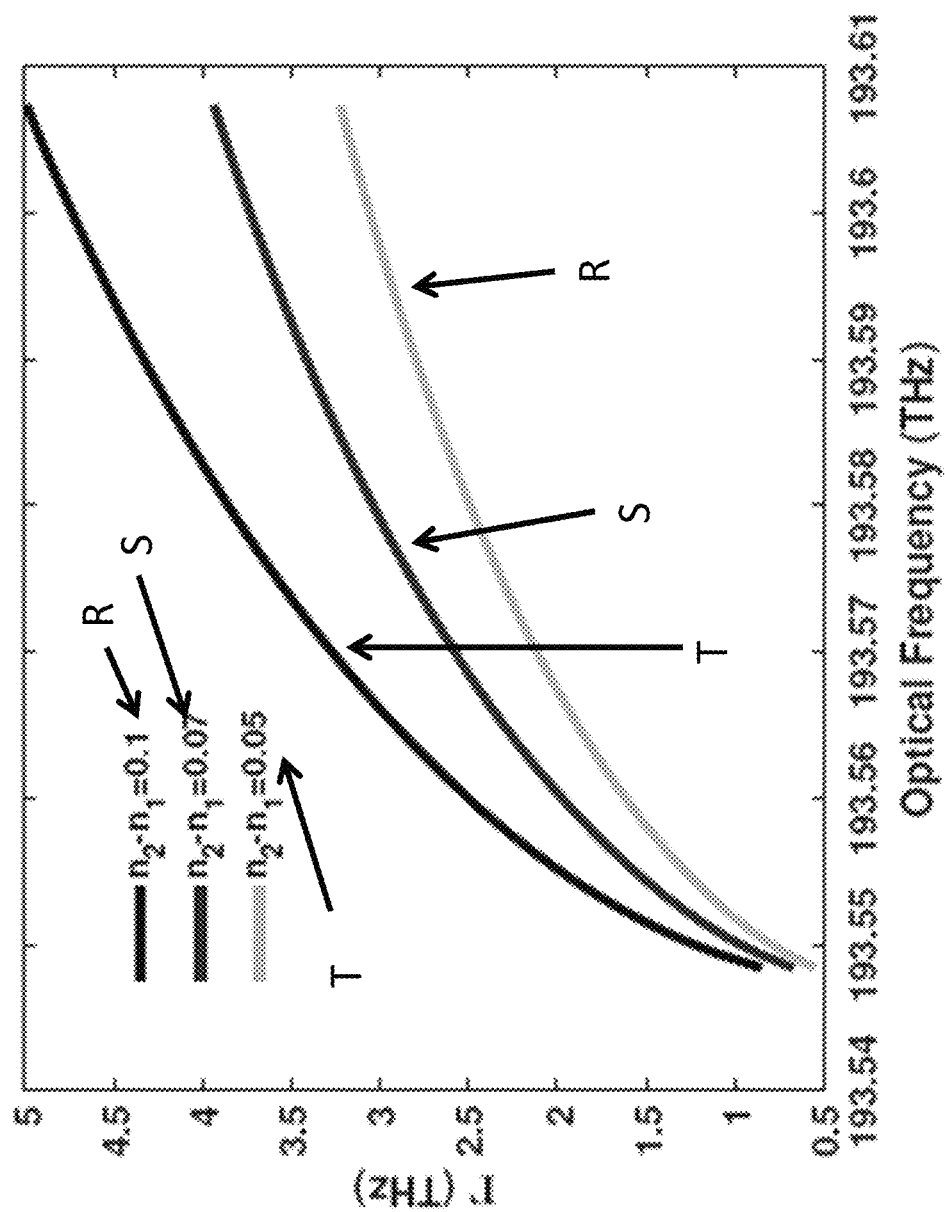

As shown in FIG. 20, an optical decay coefficient is shown versus the optical frequency for a single block of graphene layers. As such, different refractive index contrasts may be considered. Thus, as shown in FIG. 20, the optical decay coefficient is increased for larger refractive index contrast. For a given refractive index contrast, total losses can be mitigated by reducing the number of graphene layers despite a corresponding increase in the optical decay coefficient.

Figure 21:
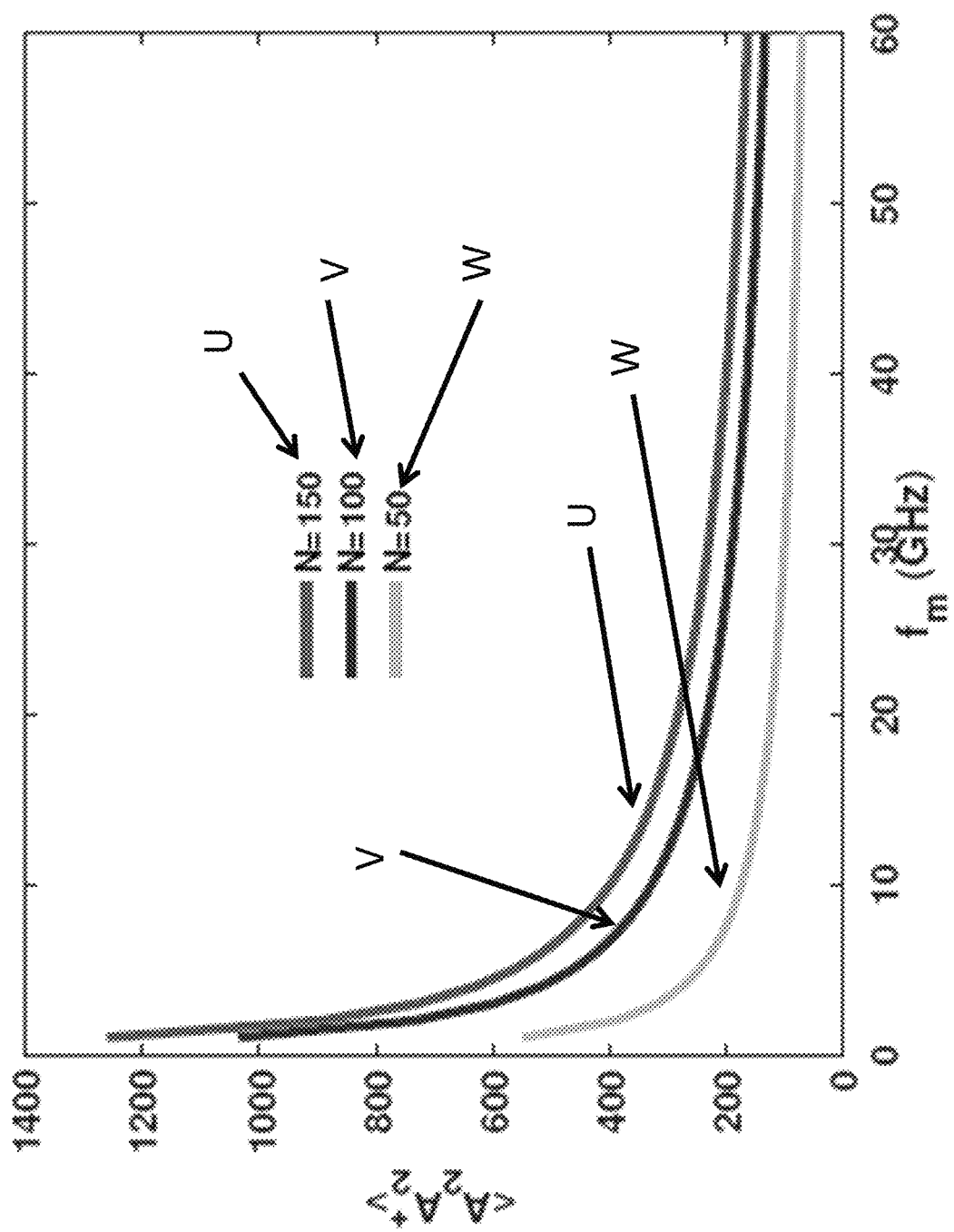

As shown in FIG. 20, an average number of photons converted to the optical domain versus the microwave frequency is calculated. As shown in FIG. 21, the refractive index contrast is n2−n1=0.1. As such, the the total number of converted photons is the same as in FIG. 16 but with a reduced number of graphene layers based on the permittivity contrast of the filling materials.

Accordingly, a graphene-based structure is described that is filled with two dielectric materials and electrically connected. In embodiments, the structure is driven by a microwave quantum signal and subjected to an optical pump. Thus, an optical modulated signal is obtained and an upper and lower sideband are generated. As such, the frequency discrimination of the transmission of the graphene layers results in suppressing the lower sideband and achieving a low noise conversion. With using two different filing materials, a small contrast in the permittivity of the filing materials, the extraction of the lower side band is significantly enhances for even tens of graphene layers. Thus, a tunable frequency conversion is achieved by fixing the lower sideband while the frequency of the optical pump and the frequency of the microwave signal are both varied.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 10, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices. Also it will be understood that any of the various actions can result in any type of electronic information to be displayed in real-time and/or simultaneously on multiple user devices. For FIGS. 3 to 9, and 14 to 21 the electronic graphs may be generated by a computing device, such as device 1000, and displayed via a graphical user device (GUI).

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, the phrase "converted text," or "converted information" may indicate information that has been converted from handwritten or non-handwritten information to printed information. The phrase "information" may indicate letters, words, numbers, and/or symbols. The phrase "text" may indicate letters, numbers, and/or symbols. The phrases "information" and "text" may indicate the same thing, i.e., letters, numbers, and/or symbols. Also, while the above examples are associated with prescriptions, pharmacists, and doctors, the above example actions may also be used for other scenarios and analysis of other types of handwritten text, such as with purchase orders, shipping orders, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic method for converting from a microwave to an optical domain, comprising:
   receiving, by a graphene structure, microvolts, wherein the microvolts are sent to the graphene structure via a microwave signal, and the microwave signal is received by the graphene structure at a quantum level, and wherein the graphene structure includes two different dielectric materials, and
      wherein the graphene structure is receiving the microvolts at a particular cryogenic temperature;
   generating, by the graphene structure, optical photons based on receiving the microvolts; and
   outputting, by the graphene structure, the optical photons at the quantum level, wherein:
      the graphene structure is a quantum modulator which generates the optical photons based on the received microvolts, and
      the generating of the optical photons is based on a microwave frequency of different electron densities.

2. The electronic method of claim 1, wherein the graphene structure has multiple graphene layers, wherein:
   the multiple graphene layers have a distance, d, from each other,
   the multiple graphene layers are connected with each other in an interdigital configuration and operate electronically as a capacitor and, at the same time, operate optically as a periodic medium, and wherein each of the graphene layers has an area of 1 mm$^2$.

3. The electronic method of claim 1, where the graphene structure has multiple graphene layers, wherein each of the multiple graphene layers has a length, L, wherein the length is less than 2.0 millimeters.

4. The electronic method of claim 1, wherein the driving voltage is less than 10 microvolts and the particular cryogenic temperature is in milli-Kelvins.

5. The electronic method of claim 1, wherein the graphene structure is pumped by an optical pump, wherein:
   the optical pump has an intensity level that is below a damage threshold level of the graphene structure, and
   the optical pump has an amplitude, $|A_1|$ of $$|A_1| = \frac{\pi v_g}{2L|g|}.$$

6. The electronic method of claim 1, further comprising:
   generating, by the graphene structure, a lower sideband, wherein the lower sideband is generated based on the microwave signal modulating the graphene structure's effective permittivity; suppressing, by the graphene structure, the lower sideband generated when the graphene structure is pumped by an optical pump,
      wherein the lower sideband is suppressed to a destruction resonance value associated with the graphene structure and wherein no reflected waves are generated at the lower sideband, and
      wherein an amount of suppression of the lower sideband is based on the two different dielectric materials;
   generating, by the graphene structure, an upper sideband at the same time that the lower sideband is generated,
      wherein a quantum state of the upper sideband only depends on a microwave signal, wherein the microvolts is sent to the graphene structure via the microwave signal.

7. The electronic method of claim 1, wherein the graphene structure has multiple graphene layers that are connected to each other in an interdigital configuration.

8. The electronic method of claim 1, wherein a conversion rate, associated with generating the optical photons from the microvolts, is based on a length of the graphene structure and the optical pump amplitude.

9. The electronic method of claim 1, wherein a refractive index contrast of the two different dielectric materials is related to a permittivity contrast by $n2-n1 \approx (\varepsilon 2-\varepsilon 1/2\varepsilon 1)$.

* * * * *